US012792968B2

(12) United States Patent
Miller et al.

(10) Patent No.: US 12,792,968 B2
(45) Date of Patent: Nov. 10, 2026

(54) RECOMMENDING CONTENT USING MULTIMODAL MEMORY EMBEDDINGS

(71) Applicant: Snap Inc., Santa Monica, CA (US)

(72) Inventors: William Miles Miller, San Francisco, CA (US); Aleksei Stoliar, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 405 days.

(21) Appl. No.: 18/613,645

(22) Filed: Mar. 22, 2024

(65) Prior Publication Data

US 2024/0354641 A1 Oct. 24, 2024

Related U.S. Application Data

(60) Provisional application No. 63/496,749, filed on Apr. 18, 2023.

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS 5,805,911 A 9/1998 Miller
10,052,026 B1 8/2018 Tran
10,282,914 B1 5/2019 Tran et al.
10,608,966 B1 3/2020 Landowski et al.
10,750,019 B1 8/2020 Petrovykh et al.
10,777,021 B2 9/2020 Aluru et al.
10,878,008 B1 12/2020 Cannon et al.
12,149,864 B1 11/2024 Zhou et al.
12,190,060 B1 1/2025 Tavanaei et al.
12,340,480 B2 6/2025 Zhi et al.
12,400,406 B2 8/2025 Xiao et al.
12,561,920 B2 2/2026 Miller et al.
2010/0169195 A1 7/2010 Trest (Continued)

FOREIGN PATENT DOCUMENTS

JP 2025049411 4/2025

OTHER PUBLICATIONS

"U.S. Appl. No. 18/497,629, Response filed Dec. 3, 2025 to Non Final Office Action mailed Sep. 10, 2025", 8 pgs.

(Continued)

*Primary Examiner* — Maryam A Nasri
(74) *Attorney, Agent, or Firm* — Schwegman Lundberg & Woessner, P.A.

(57) ABSTRACT

Described is a system for gathering interaction data from use of one or more interaction functions by a first user, wherein the interaction data includes data in different modalities and generating a multimodal memory for the interaction data by applying the interaction data to a first machine learning model. The system also identifies a prompt for the first user and processes a combination of data associated with the prompt and the multimodal memory using a second machine learning model to generate recommended content for the first user. The system then proceeds to apply the recommended content to a first interaction client of the first user.

20 Claims, 14 Drawing Sheets

(56) References Cited

U.S. PATENT DOCUMENTS

| | | | |
|---|---|---|---|
| 2013/0080928 | A1 | 3/2013 | Zhuang et al. |
| 2014/0164305 | A1 | 6/2014 | Lynch et al. |
| 2014/0176565 | A1 | 6/2014 | Adeyoola et al. |
| 2016/0378861 | A1 | 12/2016 | Eledath et al. |
| 2017/0024899 | A1 | 1/2017 | Hammoud et al. |
| 2017/0169476 | A1 | 6/2017 | Nomula et al. |
| 2017/0206691 | A1 | 7/2017 | Harrises et al. |
| 2017/0250930 | A1 | 8/2017 | Ben-itzhak |
| 2017/0308583 | A1 | 10/2017 | Husain et al. |
| 2017/0353404 | A1 | 12/2017 | Hodge |
| 2018/0047395 | A1 | 2/2018 | Sommers et al. |
| 2018/0225372 | A1 | 8/2018 | Lecue et al. |
| 2018/0233142 | A1 | 8/2018 | Koishida et al. |
| 2018/0276561 | A1 | 9/2018 | Pasternack et al. |
| 2019/0035149 | A1 | 1/2019 | Chen et al. |
| 2019/0043106 | A1 | 2/2019 | Talmor et al. |
| 2019/0050427 | A1 | 2/2019 | Wiesel et al. |
| 2019/0073197 | A1 | 3/2019 | Collins |
| 2019/0143527 | A1 | 5/2019 | Favis et al. |
| 2019/0147366 | A1 | 5/2019 | Sankaran et al. |
| 2019/0171845 | A1 | 6/2019 | Dotan-cohen et al. |
| 2019/0193273 | A1 | 6/2019 | Favis et al. |
| 2019/0236222 | A1 | 8/2019 | Allen et al. |
| 2019/0244407 | A1 | 8/2019 | Wiesel et al. |
| 2019/0317709 | A1 | 10/2019 | Sugimoto et al. |
| 2019/0325342 | A1 | 10/2019 | Sikka et al. |
| 2019/0340485 | A1 | 11/2019 | Ngo et al. |
| 2019/0371028 | A1 | 12/2019 | Harrises et al. |
| 2020/0013232 | A1 | 1/2020 | Kwai |
| 2020/0013233 | A1 | 1/2020 | Kwai |
| 2020/0082607 | A1 | 3/2020 | Degtyarev et al. |
| 2020/0104653 | A1 | 4/2020 | Solomon et al. |
| 2020/0125678 | A1 | 4/2020 | Conley et al. |
| 2020/0143447 | A1 | 5/2020 | Wang et al. |
| 2020/0202579 | A1 | 6/2020 | Caballero et al. |
| 2020/0242305 | A1 | 7/2020 | Wu |
| 2020/0250235 | A1 | 8/2020 | Abhyankar et al. |
| 2020/0342874 | A1 | 10/2020 | Teserra et al. |
| 2021/0065705 | A1 | 3/2021 | Ham et al. |
| 2021/0136019 | A1 | 5/2021 | Price et al. |
| 2021/0150806 | A1 | 5/2021 | Guler et al. |
| 2021/0295203 | A1 | 9/2021 | Liao et al. |
| 2021/0297498 | A1 | 9/2021 | Divakaran et al. |
| 2021/0390411 | A1 | 12/2021 | Carvalho et al. |
| 2022/0058347 | A1 | 2/2022 | Singaraju et al. |
| 2022/0067296 | A1 | 3/2022 | Singh Bawa et al. |
| 2022/0114751 | A1 | 4/2022 | Kannan et al. |
| 2022/0199079 | A1 | 6/2022 | Hanson et al. |
| 2022/0210098 | A1 | 6/2022 | Zhang et al. |
| 2022/0237368 | A1 | 7/2022 | Tran |
| 2022/0300494 | A1 | 9/2022 | Ma |
| 2022/0327608 | A1 | 10/2022 | Assouline et al. |
| 2023/0037894 | A1 | 2/2023 | Arya et al. |
| 2023/0059979 | A1 | 2/2023 | Sharma et al. |
| 2023/0078483 | A1 | 3/2023 | Berger et al. |
| 2023/0101374 | A1 | 3/2023 | Kosecoff |
| 2023/0103125 | A1 | 3/2023 | Berger et al. |
| 2023/0111489 | A1 | 4/2023 | Zohar et al. |
| 2023/0115551 | A1 | 4/2023 | Jin et al. |
| 2023/0116652 | A1 | 4/2023 | Berger et al. |
| 2023/0126177 | A1 | 4/2023 | Xu et al. |
| 2023/0229960 | A1 | 7/2023 | Zhu et al. |
| 2023/0245350 | A1 | 8/2023 | Webber et al. |
| 2023/0252747 | A1 | 8/2023 | Meador et al. |
| 2023/0274743 | A1 | 8/2023 | Scherer et al. |
| 2024/0029358 | A1 | 1/2024 | Sharma et al. |
| 2024/0113990 | A1 | 4/2024 | Palraj et al. |
| 2024/0135662 | A1 | 4/2024 | Zhang et al. |
| 2024/0161423 | A1 | 5/2024 | Sholl et al. |
| 2024/0163232 | A1 | 5/2024 | Jayaraman et al. |
| 2024/0169622 | A1 | 5/2024 | Xie et al. |
| 2024/0192766 | A1 | 6/2024 | Furtwangler |
| 2024/0202796 | A1 | 6/2024 | Sadr et al. |
| 2024/0211826 | A1 | 6/2024 | Rewerenda et al. |
| 2024/0242267 | A1 | 7/2024 | Shingler |
| 2024/0249318 | A1 | 7/2024 | Spiegel et al. |
| 2024/0267344 | A1 | 8/2024 | Mulligan et al. |
| 2024/0291779 | A1 | 8/2024 | Catalano et al. |
| 2024/0296276 | A1 | 9/2024 | Hattangady et al. |
| 2024/0331211 | A1 | 10/2024 | Davis et al. |
| 2024/0331251 | A1 | 10/2024 | Santesteban Garay et al. |
| 2024/0354555 | A1 | 10/2024 | Knipfing et al. |
| 2024/0355010 | A1 | 10/2024 | Ahafonov et al. |
| 2024/0355064 | A1 | 10/2024 | Skrypnyk et al. |
| 2024/0355065 | A1 | 10/2024 | Miller et al. |
| 2024/0355131 | A1 | 10/2024 | Kuppersmith et al. |
| 2024/0356871 | A1 | 10/2024 | Brewer et al. |
| 2024/0356873 | A1 | 10/2024 | Brewer et al. |
| 2024/0378763 | A1 | 11/2024 | Assouline et al. |
| 2024/0404170 | A1 | 12/2024 | Wong et al. |
| 2025/0005436 | A1* | 1/2025 | Janusz .................. G06N 20/20 |
| 2025/0111238 | A1* | 4/2025 | Islam ..................... G06N 20/00 |
| 2025/0139895 | A1 | 5/2025 | Hoffer et al. |
| 2026/0127498 | A1* | 5/2026 | LoCascio ............... G06N 20/00 |

OTHER PUBLICATIONS

"U.S. Appl. No. 18/529,773, Non Final Office Action mailed Dec. 5, 2025", 32 pgs.

"U.S. Appl. No. 18/529,550, Notice of Allowance mailed Dec. 22, 2025", 5 pgs.

"U.S. Appl. No. 18/420,546, Response filed Jan. 2, 2026 to Non Final Office Action mailed Oct. 1, 2025", 12 pgs.

"U.S. Appl. No. 18/639,447, Final Office Action mailed Jan. 7, 2026", 21 pgs.

"U.S. Appl. No. 18/529,773, Response filed Jan. 20, 2026 to Non Final Office Action mailed Dec. 5, 2025", 13 pgs.

"U.S. Appl. No. 18/432,894, Response filed Jan. 22, 2026 to Final Office Action mailed Oct. 22, 2025", 9 pgs.

"U.S. Appl. No. 18/584,852, Notice of Allowance mailed Jan. 23, 2026", 9 pgs.

"U.S. Appl. No. 18/584,852, Corrected Notice of Allowability mailed Feb. 4, 2026", 2 pgs.

"U.S. Appl. No. 18/497,629, Notice of Allowance mailed Feb. 5, 2026", 9 pgs.

"U.S. Appl. No. 18/639,447, Examiner Interview Summary mailed Feb. 18, 2026", 2 pgs.

"U.S. Appl. No. 18/497,629, Corrected Notice of Allowability mailed Feb. 24, 2026", 2 pgs.

"U.S. Appl. No. 18/432,894, Notice of Allowance mailed Mar. 4, 2026", 10 pgs.

"Chinese Application Serial No. 202480026549.X, Voluntary Amendment filed Mar. 6, 2026", w/ English claims, 23 pgs.

"U.S. Appl. No. 18/432,894, Corrected Notice of Allowability mailed Mar. 20, 2026", 2 pgs.

"U.S. Appl. No. 18/420,546, Examiner Interview Summary mailed Jan. 22, 2025", 2 pgs.

"U.S. Appl. No. 18/420,546, Final Office Action mailed Jun. 6, 2025", 14 pgs.

"U.S. Appl. No. 18/420,546, Non Final Office Action mailed Dec. 10, 2024", 12 pgs.

"U.S. Appl. No. 18/420,546, Response filed Mar. 10, 2025 to Non Final Office Action mailed Dec. 10, 2024", 10 pgs.

"U.S. Appl. No. 18/432,894, Examiner Interview Summary mailed Jun. 26, 2025", 2 pgs.

"U.S. Appl. No. 18/432,894, Non Final Office Action mailed Apr. 10, 2025", 11 pgs.

"U.S. Appl. No. 18/432,894, Response filed Jul. 10, 2025 to Non Final Office Action mailed Apr. 10, 2025", 9 pgs.

"U.S. Appl. No. 18/532,887, Non Final Office Action mailed Jul. 2, 2025", 18 pgs.

"U.S. Appl. No. 18/584,852, Non Final Office Action mailed Jun. 18, 2025", 23 pgs.

"U.S. Appl. No. 18/639,447, Non Final Office Action mailed Jun. 3, 2025", 18 pgs.

"Dslim/bert-base-NER", Hugging Face, [Online]. Retrieved from the Internet: <URL: https://web.archive.org/web/20230130180721/https://huggingface.co/dslim/bert-base-NER>, (archived Jan. 30, 2023), 7 pgs.

(56) References Cited

OTHER PUBLICATIONS

"FLAN-T5", Hugging Face, [Online]. Retrieved from the Internet: <URL: https://web.archive.org/web/20230208084940/https://huggingface.co/docs/transformers/model_doc/flan-t5>, (archived Feb. 8, 2023), 2 pgs.
"Google/flan-u12", Hugging Face, [Online]. Retrieved from the Internet: <URL: https://web.archive.org/web/20230311131832/https://huggingface.co/google/flan-ul2>, (archived Mar. 11, 2023), 11 pgs.
"Hkunlp/instructor-large", Hugging Face, [Online]. Retrieved from the Internet: <URL: https://web.archive.org/web/20221221031926/https://huggingface.co/hkunlp/instructor-large>, (archived Dec. 21, 2022), 5 pgs.
"International Application Serial No. PCT/US2024/023744, International Search Report mailed Aug. 22, 2024", 4 pgs.
"International Application Serial No. PCT/US2024/023744, Written Opinion mailed Aug. 22, 2024", 11 pgs.
"International Application Serial No. PCT/US2024/023877, International Search Report mailed Jul. 16, 2024", 5 pgs.
"International Application Serial No. PCT/US2024/023877, Written Opinion mailed Jul. 16, 2024", 6 pgs.
"International Application Serial No. PCT/US2024/024100, International Search Report mailed Jul. 18, 2024", 4 pgs.
"International Application Serial No. PCT/US2024/024100, Written Opinion mailed Jul. 18, 2024", 8 pgs.
"International Application Serial No. PCT/US2024/024459, International Search Report mailed Aug. 23, 2024", 5 pgs.
"International Application Serial No. PCT/US2024/024459, Written Opinion mailed Aug. 23, 2024", 7 pgs.
"International Application Serial No. PCT/US2024/024788, International Search Report mailed Jul. 16, 2024", 5 pgs.
"International Application Serial No. PCT/US2024/024788, Written Opinion mailed Jul. 16, 2024", 7 pgs.
"International Application Serial No. PCT/US2024/024798, International Search Report mailed Jul. 12, 2024", 3 pgs.
"International Application Serial No. PCT/US2024/024798, Written Opinion mailed Jul. 12, 2024", 5 pgs.
"International Application Serial No. PCT/US2024/024973, International Search Report mailed Sep. 3, 2024", 7 pgs.
"International Application Serial No. PCT/US2024/024973, Written Opinion mailed Sep. 3, 2024", 7 pgs.
Bastian, Matthias, et al., "ChatARKit: ChatGPT programs AR app using natural language alone", [Online]. Retrieved from the Internet: <https://mixed-news.com/en/chatarkit-chatgpt-programs-ar-appusing-natural-language-alone/>, (Dec. 31, 2022), 6 pgs.
Ivona, Tautkute, et al., "What Looks Good with my Sofa: Multimodal Search Engine for Interior Design", arxiv.org, Cornell University Library, 201 Olin Library Cornell University Ithaca, NY 14853, (Jul. 21, 2017), 8 pgs.
Jo, Unso Eun Seo, et al., "SetFit: Efficient Few-Shot Learning Without Prompts", Hugging Face, [Online]. Retrieved from the Internet: <URL: https://huggingface.co/blog/setfit>, (Sep. 26, 2022), 10 pgs.
Jun, Ehara, et al., "Texture overlay for virtual clothing based on PCA of silhouettes", Mixed and Augmented Reality, 2006. Ismar 2006. IEEE/ACM International Symposium on, IEEE, PI, (Oct. 22, 2006), 139-142.
Kawanishi, Katsuhiro, "How to Apply a Filter to Multiple Faces", [Online] Retrieved from the internet: <https://support.lensstudio.snapchat.com/hc/en-us/community/posts/4407620857236-How-to-apply-a-filter-to-multiple-faces>, (2021).
Liang, Yaoyuan, et al., "Multi-modal Contextual Graph Neural Network for Text Visual Question Answering", 2020 25th International Conference on Pattern Recognition (ICPR), IEEE, (Jan. 10, 2021), 8 pgs.
Nicholas, Renotte, "Real Time AI Face Landmark Detection in 20 Minutes with Tensorflow.JS and React", [Online] Retrieved from the internet: <https://www.youtube.com/watch?v=7IXYGDVHUNw>, (2020).
Sri Krishna, "Stable Diffusion creator Stability AI accelerates open-source AI, raises $101M", [Online] Retrieved from the internet: <https://venturebeat.com/ai/stable-diffusion-creator-stability-ai-raises-101m-funding-to-accelerate-open-source-ai/>, (Oct. 18, 2022).
Zaubar, "Zaubar Magic: AI-powered content creation tool for the metaverse by Zaubar", [Online]. Retrieved from the Internet: <https://www.youtube.com/watch?v=zpa30DWUyco>, (Apr. 6, 2023), 2 pgs.
"International Application Serial No. PCT/US2024/012626, International Search Report mailed Apr. 4, 2024", 4 pgs.
"International Application Serial No. PCT/US2024/012626, Written Opinion mailed Apr. 4, 2024", 5 pgs.
"Our Shift to the Walls Approach", [Online]. Retrieved from the Internet: <https://web.archive.org/web/20210930180047/https://latitude.io/blog/the-walls-approach>, (Sep. 30, 2021), 2 pgs.
"International Application Serial No. PCT/US2024/016940, International Search Report mailed May 24, 2024", 3 pgs.
"International Application Serial No. PCT/US2024/016940, Written Opinion mailed May 24, 2024", 9 pgs.
"International Application Serial No. PCT/US2024/014450, International Search Report mailed Jun. 3, 2024", 4 pgs.
"International Application Serial No. PCT/US2024/014450, Written Opinion mailed Jun. 3, 2024", 5 pgs.
"U.S. Appl. No. 18/420,546, Examiner Interview Summary mailed Jul. 21, 2025", 2 pgs.
"U.S. Appl. No. 18/584,852, Examiner Interview Summary mailed Jul. 23, 2025", 2 pgs.
"International Application Serial No. PCT/US2024/012626, International Preliminary Report on Patentability mailed Aug. 7, 2025", 7 pgs.
"U.S. Appl. No. 18/529,550, Notice of Allowance mailed Aug. 22, 2025", 16 pgs.
"International Application Serial No. PCT/US2024/014450, International Preliminary Report on Patentability mailed Aug. 21, 2025", 7 pgs.
"U.S. Appl. No. 18/639,447, Response filed Sep. 3, 2025 to Non Final Office Action mailed Jun. 3, 2025", 10 pgs.
"International Application Serial No. PCT/US2024/016940, International Preliminary Report on Patentability mailed Sep. 4, 2025", 11 pgs.
"U.S. Appl. No. 18/420,546, Response filed Sep. 8, 2025 to Final Office Action mailed Jun. 6, 2025", 10 pgs.
"U.S. Appl. No. 18/497,629, Non Final Office Action mailed Sep. 10, 2025", 14 pgs.
"U.S. Appl. No. 18/584,852, Response filed Sep. 18, 2025 to Non Final Office Action mailed Jun. 18, 2025", 9 pgs.
"U.S. Appl. No. 18/532,887, Response filed Sep. 26, 2025 to Non Final Office Action mailed Jul. 2, 2025", 10 pgs.
"U.S. Appl. No. 18/420,546, Non Final Office Action mailed Oct. 1, 2025", 8 pgs.
"U.S. Appl. No. 18/532,887, Examiner Interview Summary mailed Oct. 1, 2025", 2 pgs.
"U.S. Appl. No. 18/432,894, Final Office Action mailed Oct. 22, 2025", 14 pgs.
"U.S. Appl. No. 18/532,887, Notice of Allowance mailed Oct. 28, 2025", 5 pgs.
"International Application Serial No. PCT/US2024/024973, International Preliminary Report on Patentability mailed Oct. 30, 2025", 9 pgs.
"International Application Serial No. PCT/US2024/023744, International Preliminary Report on Patentability mailed Oct. 30, 2025", 13 pgs.
"International Application Serial No. PCT/US2024/023877, International Preliminary Report on Patentability mailed Oct. 30, 2025", 8 pgs.
"International Application Serial No. PCT/US2024/024100, International Preliminary Report on Patentability mailed Oct. 30, 2025", 10 pgs.
"International Application Serial No. PCT/US2024/024459, International Preliminary Report on Patentability mailed Oct. 30, 2025", 9 pgs.
"International Application Serial No. PCT/US2024/024798, International Preliminary Report on Patentability mailed Oct. 30, 2025", 7 pgs.

(56) References Cited

OTHER PUBLICATIONS

"International Application Serial No. PCT/US2024/024788, International Preliminary Report on Patentability mailed Oct. 30, 2025", 9 pgs.
"U.S. Appl. No. 18/497,629, Examiner Interview Summary mailed Nov. 25, 2025", 2 pgs.
Buckley, Sean, "Roblox launches its first generative AI game creation tools", engadget, [Online]. Retrieved from the Internet: <URL: https://www.engadget.com/roblox-launches-its-first-generative-ai-game-creation-tools-192043349.html>, (Mar. 21, 2023), 4 pgs.

* cited by examiner

RECOMMENDING CONTENT USING MULTIMODAL MEMORY EMBEDDINGS

CLAIM OF PRIORITY

This application claims the benefit of priority to U.S. Provisional Application Ser. No. 63/496,749, filed on Apr. 18, 2023, which is incorporated herein by reference in its entirety.

TECHNICAL FIELD

The present disclosure relates generally to recommending content, and more specifically recommending content using multimodal memory embeddings.

BACKGROUND

As the popularity of online mobile applications grows, companies use data analysis techniques to provide recommended content to users. These recommendations aim to provide the most value to users by showing them content that is relevant and interesting to them. Subject to regulations and privacy laws worldwide, companies collect vast amounts of data from users, including their interests, demographic information, browsing history, likes, shares, comments, and connections with other users. Based on the collected data, companies create a user profile that is used to identify relevant content on their platforms. Companies may also employ natural language processing and image recognition techniques to better understand the content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
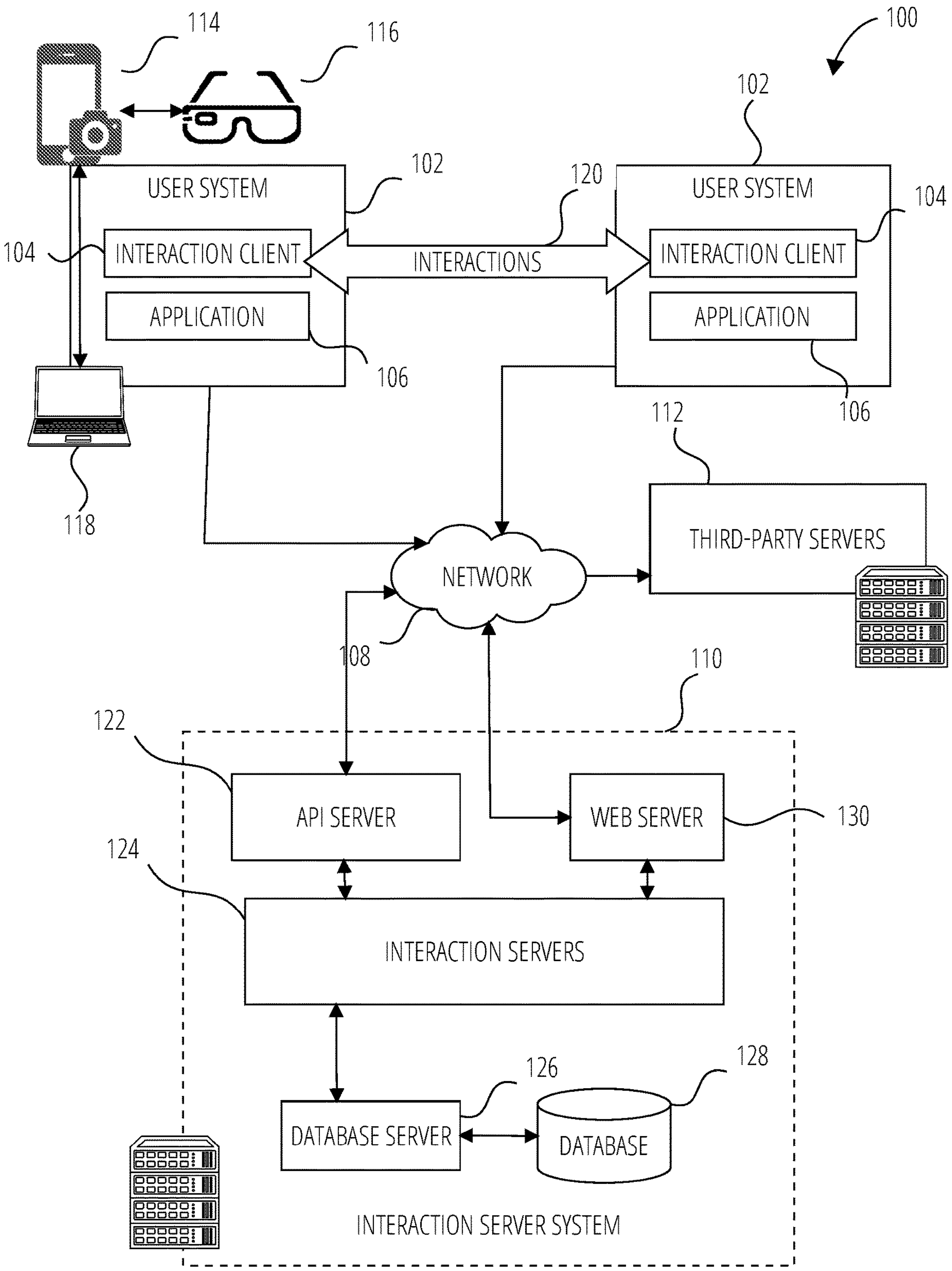
FIG. 1 is a diagrammatic representation of a networked environment in which the present disclosure may be deployed, according to some examples.

Traditional systems attempt to provide recommended content to users on their platforms based on data the platforms collect. Traditional systems for content recommendation primarily rely on either collaborative filtering or content-based filtering methods. However, such recommendations are very limited. Collaborative filtering struggles when new users or items are introduced to the platform, as there is insufficient data to make accurate recommendations. Similarly, content-based filtering may not perform well for new users, as their preferences and interests are not yet established.

Moreover, in many cases, the user interaction matrix is sparse, meaning most users only interact with a small fraction of the available content. This sparsity can make it challenging for collaborative filtering algorithms to identify meaningful relationships between users and items. Furthermore, as the platforms grow, the volume of data increases, making it more computationally expensive to process and analyze. This can lead to challenges in maintaining real-time, accurate recommendations.

Traditional content-based filtering methods often rely on basic features like keywords, tags, or categories. These approaches may not capture the full context or nuanced relationships between different pieces of content. In addition, traditional systems are limited to modalities when assessing new content for users, such as an AR device making decisions from data collected from the AR device and not other interaction clients of the user). Furthermore, traditional systems are limited to the interaction function that the user is involved in (such as the text of a chat window).

To overcome these limitations and challenges, the disclosed interaction systems apply multimodal memory embeddings in content recommendation systems. User interaction data is often multimodal, combining text, images, video, and audio. By incorporating multiple modalities into the recommendation process, the disclosed techniques can better understand the content and its context, leading to more relevant recommendations.

Example interaction systems apply memory embeddings, which are continuous vector representations that capture the semantic relationships between different pieces of content or user preferences. By employing memory embeddings, the disclosed techniques can quickly and efficiently store and retrieve information about users and items, overcoming the problems of traditional systems described above. Example interaction systems leverage deep learning techniques, such as convolutional neural networks (CNNs) for image analysis and recurrent neural networks (RNNs) or transformers for text analysis. These models can automatically learn complex, high-level features from the raw data, leading to more accurate recommendations.

The disclosed techniques combine embeddings from different modalities to create a unified representation of the content or user preferences. This fusion enables the disclosed techniques to leverage complementary information from different data sources, resulting in a more comprehensive understanding of the content and users.

In this way, by applying multimodal memory embeddings to content recommendation, the disclosed techniques address the limitations of traditional methods by incorporating multiple data modalities, using deep learning techniques for feature extraction, and fusing these representations to provide more accurate and relevant content suggestions for users. This enables content recommendations to be generated easier, faster, or more intuitively obviating a need for certain efforts or resources that otherwise would be involved in a content recommendation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 810); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
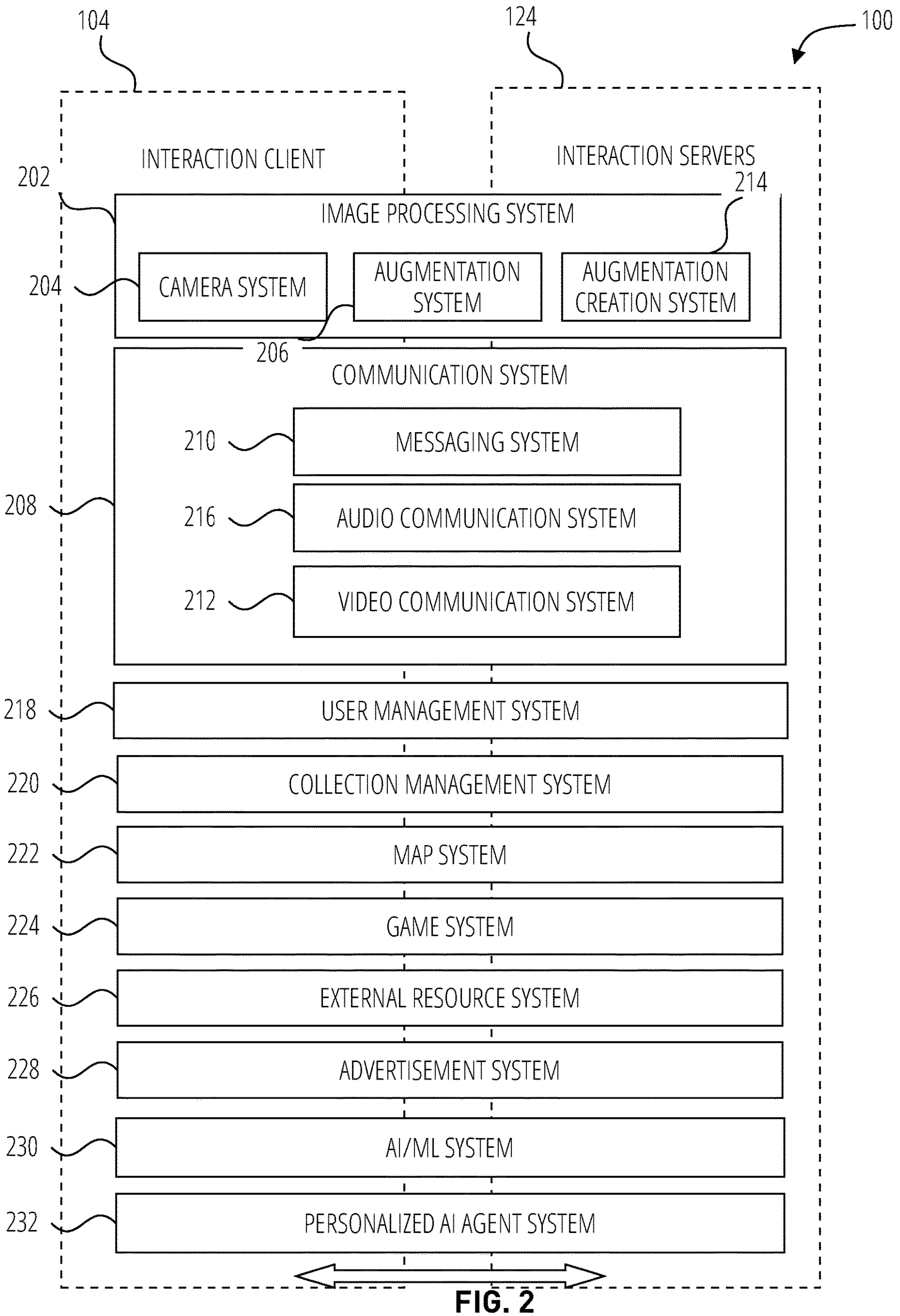
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

- Function logic: The function logic implements the functionality of the microservice subsystem, representing a specific capability or function that the microservice provides.
- API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.
- Service discovery: Microservice subsystems may find and communicate with other microservice subsystems of the interaction system 100. Service discovery mechanisms enable microservice subsystems to locate and communicate with other microservice subsystems in a scalable and efficient way.
- Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1002 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 808, entity graphs 810 and profile data 802) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an “event gallery” or an “event story.” Such a collection may be made available for a specified time period, such as the duration of an event to which the content relates. For example, content relating to a music concert may be made available as a “story” for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 802) on a map to indicate a current or past location of “friends” of a user, as well as media content (e.g., collections of messages including photographs and videos) generated by such friends, within the context of a map. For example, a message posted by a user to the interaction system 100 from a specific geographic location may be displayed within the context of a map at that particular location to “friends” of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide personalized AI agent system 232 functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

In generative AI examples, the prediction/inference data that is output include trend assessment and predictions, translations, summaries, image or video recognition and categorization, natural language processing, face recognition, user sentiment assessments, advertisement targeting and optimization, voice recognition, or media content generation, recommendation, and personalization.

A personalized AI agent system 232 provides personalized features to a user of an interaction client 104 by analyzing user data and behavior to understand their preferences and interests. By utilizing machine learning algorithms and data analytics, the personalized AI agent system 232 can learn and adapt to inferences of the data, and then generatively suggest content relevant, specific, and custom tailored to the user. The personalized AI agent system 232 can analyze data from multiple sources, such as various user systems 102, messages, profile information, external data sources 316, image data captured in real-time by a camera of the user system 102, and/or any combination thereof to generate content items in real time and provide such content items to the user.

The personalized AI agent system 232 tracks interaction functions including user activity, such as the posts the users like, share, or comment on, the topics the users follow, the people the users connect with, and the time the users spend on the platform. Tracking performed by the personalized AI agent system 232 is only enabled if the user opts into the experience of receiving real-time generated content. The personalized AI agent system 232 can present to the user a full list of all activity and information that will be tracked and used to generate real time content recommendations. Only after receiving confirmation from the user that the user approves having such activity and information tracked does the personalized AI agent system 232 begin collecting such data and using such data to provide and generate the real time and on-the-fly content for presentation to the user.

The personalized AI agent system 232 can retrieve data from multiple data sources, such as activity on a user's mobile phone, an AR/VR device, a smart watch, a laptop, or other user device. Based on this information, the personalized AI agent system 232 identifies patterns and predicts user's interests to generate a multimodal memory for a particular user. The personalized AI agent system 232 analyzes the user's profile information, such as their age, gender, location, messages exchanged, and/or interactions performed on the user system 102 to provide personalized features. In some examples, the personalized AI agent system 232 suggests events and groups that are nearby, or recommend job opportunities that match the user's qualifications. The personalized AI agent system 232 generates real-time AR experiences and/or message content that is/are relevant to current circumstances and/or a real-world environment perceived by the user.

Moreover, the personalized AI agent system 232 analyzes the content that the user creates and suggests the best time to post, the optimal hashtags to use, and the type of content that receives the most engagement. By doing so, the personalized AI agent system 232 helps the user increase their visibility and reach a wider audience. In this way, the personalized AI agent system 232 assesses data from different devices to provide personalized features through a variety of different devices. The personalized AI agent system 232 provides such personalized features automatically in real time based on the multimodal memory associated with the user and in the communication channel for the particular content that is preferred by the user. Analyzing user data and behavior to understand their preferences and interests, and then suggesting and generating content that are relevant to the users not only enhances the user experience but also increases engagement and retention rates on the platform.

Figure 3:
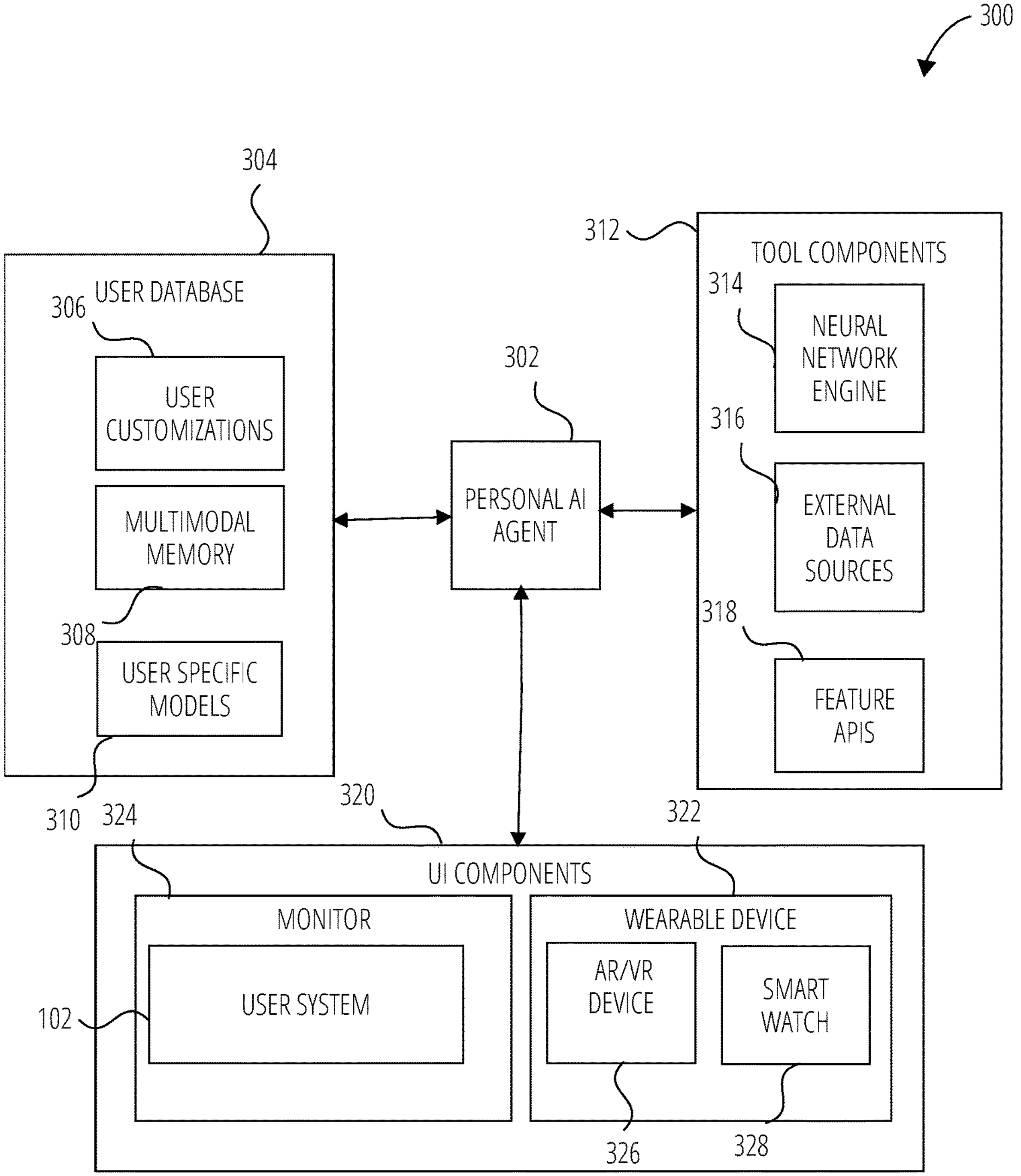
FIG. 3 illustrates an architecture for applying a personalized personal AI agent to identify relevant features for a user, according to some examples.

FIG. 3 illustrates an example architecture 300 for applying a personal AI agent 302 to identify relevant features that are personalized for a user. The example architecture 300 can include a personal AI agent 302, a user database 304, tool components 312, and UI components 320. The personal AI agent 302 implements one or more machine learning models that communicate with user database 304, UI components 320, and the tool components 312 to selectively and intelligently generate content to a user.

The user database 304 includes user customizations database 306, a multimodal memory 308, and user-specific models 310. In some cases, the personal AI agent 302 collects data from various sources and generates a multimodal memory 308 specific for a particular user. The personal AI agent 302 then provides personalized features to the user based on the identity model captured in the multimodal memory 308.

The multimodal memory 308 stores information pertinent to a user, such as the user using or applying interaction functions on the interaction system. Any of the data collected and stored in the multimodal memory 308 is collected and stored with express permission from the user on an opt-in basis. Non-limiting examples of multimodal memory data types include:

- Demographic data: information such as age, gender, location, income, education, and occupation.
- Behavioral data: information about an individual's actions and interactions with a website, application, VR device, or other digital touchpoints. This data can include website visits, clicks, downloads, purchases, and user interaction with other users.
- Psychographic data: information about an individual's personality.
- Contextual data: information about the time, location, and device used by an individual when interacting with digital touchpoints. This data can help the personal AI agent 302 to understand the context of the interaction and personalize the experience accordingly.
- Purchase history data: information about an individual's past purchases, such as products bought, frequency of purchases, and purchase amounts. This data can be used by the personal AI agent 302 to create personalized recommendations and offers. Data can also include advertisement interaction data that includes user's interactions with advertisements such as clicks, impressions, and conversions.
- Interest data: information about an individual's hobbies, interests, and passions, which can be collected through online posts and activities.
- Communication data: information about how an individual prefers to be contacted and their communication history with other users. This data can be used to personalize communication channels and messaging (e.g., SMS message on phone or pop-up message on AR device).

Data from augmentation devices (such as AR/VR devices): information from a camera feed that the user uses to capture images or videos of the user's surroundings, selections of digital content items, such as augmentations or overlays used on the camera feeds, biometric data such as heart rate, body temperature, facial expressions, and/or the like, user's preferred interaction methods on the AR device, types/duration of AR interactions, eye tracing, eye focus, and gaze direction for where users are looking and for how long, body movements such as head or body motions, gestures, or interactions with the virtual environment, hand and finger movements using controllers or tracking devices, audio data from a microphone, user emotional responses such as heart rate, skin conductance, or facial expressions, user cognitive performance such as attention, memory, or problem-solving skills, and/or the like.

Contacts and connections data: data about a user's contacts and connections, including their friends, followers, and groups.

Device data: information about the user's device, including the type of device, operating system, and browser, which can be used to optimize the platform's performance and to provide a seamless experience across different devices.

The personal AI agent 302 links different aspects of a user profile into a multimodal memory 308. The multimodal memory 308 stores various aspects of a user (e.g., users' preferences, lifestyles, interest, friends) and can use this contextual information later on to create custom-tailored content. The value of such custom-tailored content increases over time and across other form factors as the personal AI agent 302 collects more data related to the user. With more and more digital touchpoints from the user as time progresses, the personal AI agent 302 gains a much deeper understanding of the user and can use historical context to find relevancy in any current user activity.

Multimodal memory 308 includes entity-based memory, which refers to memory that is focused on specific things, such as objects, people, places, events, and experiences. This aspect of multimodal memory 308 stores information about the attributes, features, and characteristics of these specific objects or people, such as remembering the name of a person, their appearance, their occupation, or their interests. In other examples, multimodal memory 308 includes a knowledge graph memory, which refers to memory that is focused on how things are related or connected to each other. This aspect of the multimodal memory 308 organizes information in a structured way, where entities are linked together based on their relationships and attributes in a weighted manner. Knowledge graph memory helps the personal AI agent 302 understand the context and meaning of information by showing how different entities and concepts are related.

Each entity in the multimodal memory 308 can be linked to each other entity. The links between these entities can be weighted in different manners to represent how closely related the entities are to each other. For example, an entity representing a dog name can be linked to an entity for the user and to an entity representing animals whereas another entity representing a human with the same name can be linked to the entity for the user and another entity representing contacts of the user. The entity representing the dog name can be linked with a greater weight to the entity for the animal than the link between the entity representing the human with the same name and the entity for the animal. Similarly, the entity representing the human with the same name as the dog can be linked with a greater weight to the entity for the contacts than the link between the entity representing the dog name and the entity for the human. In this way, a variety of information about a given user or individual or organization can be collected and related to establish links between the information.

In some cases, the entity-based memory is focused on specific things, while the knowledge graph memory is focused on how things are related. Entity-based memory stores information about individual entities, while knowledge graph memory organizes information based on the relationships and connections between entities. Both types of memory can be used to learn and understand the current context associated with one or more users. For example, the personal AI agent 302 can use the user database 304 to determine that a user posts a picture captured from a mobile phone with the user's dog and the caption or comments refer to the dog as Jake. The personal AI agent 302 can update the multimodal memory 308 for the user to store a link that associates the user with a dog named Jake, such as a link between an entity representing a dog and another entity representing the name Jake. Later on, the personal AI agent 302 can determine that the user is using a user system 102, such as an AR device, and the user can ask for the nearest hospital for Jake. The personal AI agent 302 accesses the multimodal memory 308 and determines that Jake is a dog based on the strength of the link between the name Jake and the entity for a dog. The personal AI agent 302 then recommends veterinary hospitals for the user.

The personal AI agent 302 uses embeddings for the multimodal memory 308, which refers to a technique used in machine learning to represent and store data from multiple modalities (such as images, text, and audio) in a common vector space. The purpose of embeddings is to capture the semantic meaning and relationships between different modalities, allowing for more efficient and accurate processing of multimodal data. In some examples, the personal AI agent 302 feeds the knowledge graph to an external or internal process to generate the latent embeddings. The personal AI agent 302 stores the latent embeddings in the multimodal memory 308 for use in generating the on-the-fly content recommendations and analysis. In some cases, the content recommendations are provided to the user system 102 without the user issuing a specific request for the content recommendations. For example, the user system 102 is used to capture or access an image, and the personal AI agent 302 detects the image being viewed by the user system 102. The personal AI agent 302 leverages the user database 304 to generate a specific AR experience and can automatically apply the generated AR experience on the image currently being accessed or viewed by the user system 102. In some cases, the personal AI agent 302 uses the tool components 312 (discussed below) to generate the unique AR experience and to provide and activate the AR experience on the user system 102.

The personal AI agent 302 uses these embeddings for cross-modal comparisons and analysis. In some examples, an embedding of an image is compared to the embedding of a corresponding text description to identify semantic relationships between the two. In the context of the multimodal memory 308, embeddings are used to store and retrieve information from different modalities in a more efficient and effective manner. In some examples, if a user has stored an entity (e.g., a memory object) that includes an image, text description, and audio recording, embeddings can be used to represent each of these modalities in a common vector space. This allows for the efficient retrieval and integration of information from multiple modalities when accessing the memory object.

The personal AI agent 302 generates embeddings using one or more techniques, such as neural networks. These embeddings can be fine-tuned and optimized for specific applications and tasks. The personal AI agent 302 creates embeddings for the multimodal memory that includes information about individuals and their relationships with other individuals, entities, and devices and the embeddings are generated using various data sources as described herein by identifying patterns and connections between entities. As such, the personal AI agent 302 can apply the multimodal memory for the user in a variety of different ways to provide personalized features for the user.

Users in the past may have selected certain customization options, such as content augmentations, graphics, or features within an application or AR device. The interaction system (e.g., the interaction system 100) stores such customizations of the user in a user customizations database 306. The personal AI agent 302 uses such customizations in providing relevant content, such as by identifying preferences of customizations of the user. In some examples, the user may have used a certain type of augmentation (e.g., adding pizza to camera feeds) or stickers that the user sends to friends.

The user customizations database 306 includes customizations made by the user within the interaction system. The user customizations database 306 stores profile customization (e.g., profile picture, cover photo, and introduction), news feed preferences (e.g., prioritizing certain friends, pages, and groups), and privacy settings (e.g., who can see posts, profile information, and activity). The user customizations database 306 stores personalized avatar and sticker selection, customized content augmentations and how these were applied to a camera feed, sound and music preferences for content creation, subscription preferences for channels and creators, and other types of user customizations based on user's viewing history and engagement.

The user-specific models 310 include generative models for generating graphics, text, and images for the user. For example, the user specific models 310 can generate stickers that include photographs, graphics, or animations. The user specific models 310 generate avatars that represent users on the interaction system platform. Users can customize avatars to reflect the user's appearance, personality, and interests. The user specific models 310 generate filters and content augmentations, such as augmented reality (AR) effects that can be applied in real-time, to enhance photos and videos. The user specific models 310 generate memes to share humorous images, videos, and captions that convey a specific cultural idea or trend. The user specific models 310 generate hashtags to categorize and organize user posts based on a particular theme or topic, which allow users to connect with other users who share similar interests or to participate in trending conversations. The user specific models 310 generate short-lived photos and videos that can be viewed by their followers for a limited time, which include filters, stickers, and text overlays to make them more engaging.

The tool components 312 include one or more neural network engines 314, one or more external data sources 316, and one or more feature APIs 318. The neural network engine 314 includes one or more generative machine learning models. The generative machine learning models can be trained to generate a variety of different content. For example, the generative machine learning models are trained to receive a prompt as input (which can include any combination of text, images, audio, and/or videos) and to generate an output that responds to the prompt. In some cases, the generative machine learning models generate an artificial image/video and/or text that is responsive to the prompt. In some cases, the generative machine learning model generates content augmentations, such as filters that can overlay, modify, or augment a real-world camera feed with digital content items. In some cases, the personal AI agent 302 provides as input to the neural network engine 314 a prompt that is generated by the personal AI agent 302 based on information gathered from the UI components 320 (representing a current real-world environment) and user database 304. Namely, the personal AI agent 302 generates a prompt that includes an image captured by the user system 102 and one or more vectors derived from the multimodal memory 308. This prompt can be provided as input to the neural network engine 314. The neural network engine 314 then accesses additional sources of data, such as external data sources 316 and/or feature APIs 318 to generate content that matches the inputs of the prompt. In some examples, the personal AI agent 302 collects contextual data of a conversation, hears audio from the user, and/or receives some other input from the user or the user's environment and generates a request for the neural network engine 314.

The external data sources 316 can include various search engines, chat bots, email applications, calendar applications, messaging applications, social network applications, news sources, live media sources, and/or any combination thereof. The personal AI agent 302 accesses external data from external data sources 316 to generate and/or apply multimodal memory 308 for a user. In some examples, the personal AI agent 302 collects user data in different media types and creates embeddings for the user's multimodal memory 308. The personal AI agent 302 can retrieve data from external data sources 316 to apply to multimodal memory 308 and/or to use in generating the input for the neural network engine 314. The external data sources 316 can include any combination of a repository of scientific papers that include content information about the papers, title, author, abstract, keywords, and citations; data from emails, such as email addresses, contact lists, email content, attachments, and metadata (such as timestamps and IP addresses); search engine data, such as search queries, search history, location data, device information, and web activity; and/or communication data, such as messages, voice and video calls, roles in group messages, posts, comments, votes, user subscriptions, likes, followers, and hashtags.

Figure 4:
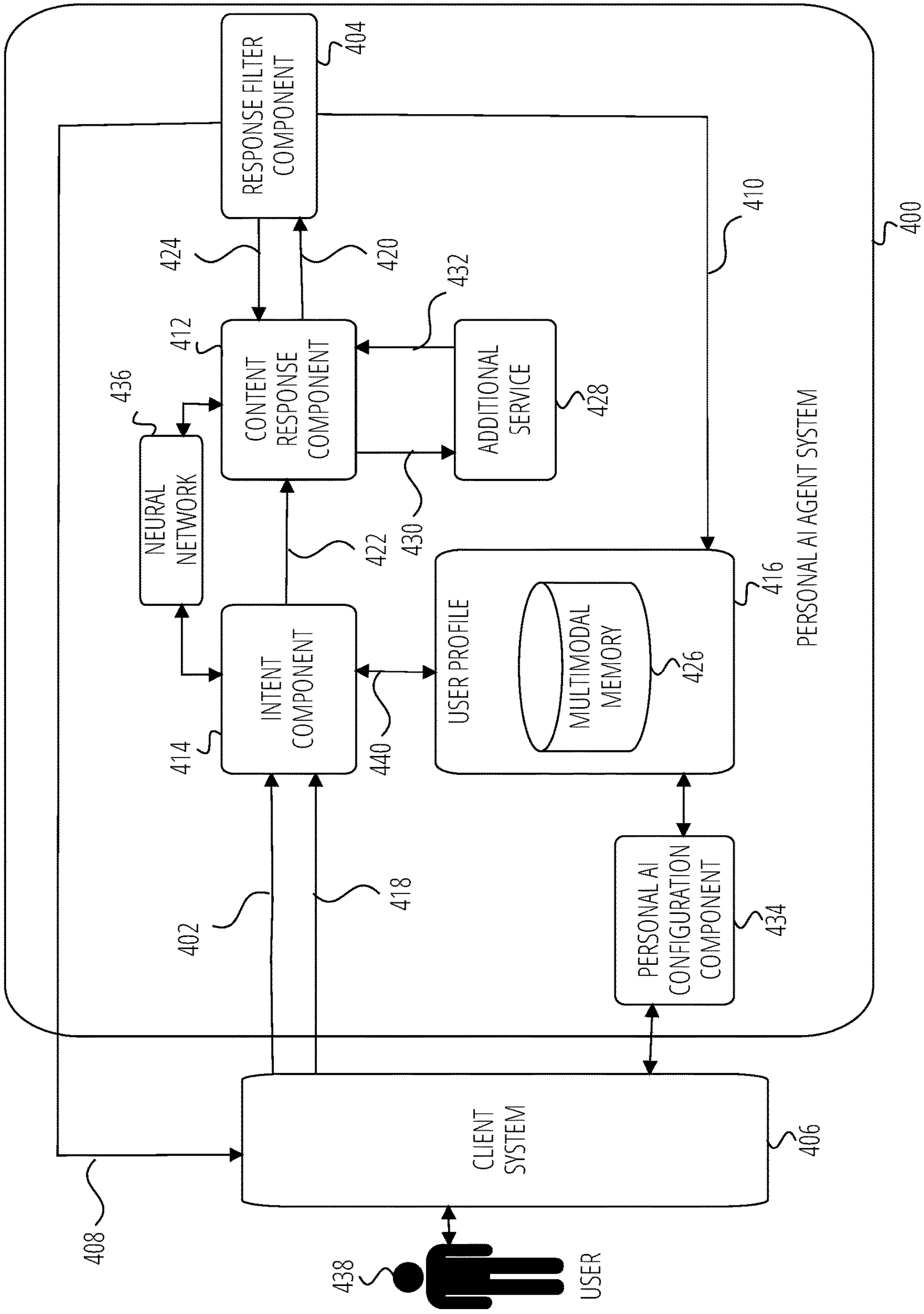
FIG. 4 is a block diagram of a personal AI system, according to some examples.

The neural network engine 314 can intelligently select one or more of the external data sources 316 to populate data to respond to the prompt received from the personal AI agent 302. The feature APIs 318 can provide access to a variety of different additional tools which may be proprietary. Using a given one of the APIs from the feature APIs 318, the neural network engine 314 can access additional machine learning tools to generate additional content. For example, one of the proprietary tools can include an AR experience generation tool. The neural network engine 314 can access the API of this tool to prompt the tool to generate an AR experience having specific features generated by the neural network engine 314 based on the prompt received from the personal AI agent 302. The neural network engine 314 can receive the specific AR experience and can further apply various effects and modifications to the AR experience in order to generate a response to the personal AI agent 302 that includes the AR experience matching the prompt. The personal AI agent 302 can then automatically augment and/or modify the image currently being presented on the user system 102 using the unique AR experience generated by the neural network engine 314. FIG. 4 shows one example of one of the many tool components 312 that can be accessed by the personal AI agent 302 to generate content. The components shown in FIG. 4 can be part of the neural network engine 314.

The personal AI agent 302 retrieves the personalized content for the user and applies the content through various feature APIs 318. The personal AI agent 302 applies the personalized and/or recommended content to interaction client features via the feature APIs 318 including a photo, video, or podcast that a user captures and shares with friends. The personal AI agent 302 recommends filters, stickers, text overlays, or content augmentation effects applied to a camera feed that can be then recorded and sent to individual users. The personal AI agent 302 applies the personalized and/or recommended content to interaction client features via the feature APIs 318 including messages, photos, and videos to individual friends or to groups; collection of photos or videos, such as a collection that can be viewed by friends for up to a certain time period (e.g., 24 hours); content from media partners, such as news articles, videos, and shows that are custom-curated for the user; map-related features, such as when and who to share locations with, how the system shares and what information is displayed on the map user interface; filters and/or XR experiences that include visual overlays applied to photos or video, such as adding location-based information, temperature, time, and other graphics; and customized avatars that can be used in photos/video, chat messages, and in other features.

In many cases, multiple input devices can be accessed by the personal AI agent 302 to generate the prompt for the neural network engine 314. These input devices or combination of input devices can include a Wearable device 322 such as an AR/VR device 326, a device with a monitor 324 such as a user system 102, and/or a smart watch 328. The outputs generated by the personal AI agent 302 can be provided to any one of the same or different combinations of the AR/VR device 326, a user system 102, and/or a smart watch 328. The personal AI agent 302 identifies the preferred method of communication using the multimodal memory 308. In some examples, the personal AI agent 302 identifies that the user likes to be reminded via the smart watch 328, given directions on the AR/VR device 326, and receive text messages on the user's mobile phone.

The process for training the neural network engine 314 can be the same as previously discussed. The neural network engine 314 can receive a collection of training data that includes a variety of different prompts and ground truth responses. These ground truth responses can include identification of sources of data that can be used to respond to a prompt and/or generated image content or text content that responds to the prompt. The neural network engine 314 can iterate over the training data until a loss function satisfies a stopping criterion, where at each iteration, parameters of the neural network engine 314 are updated. In a similar manner, the personal AI agent 302 can be trained based on training data to generate a prompt to provide to the neural network engine 314. The training data can include a variety of latent vectors, images, and information obtained from the user database 304 and corresponding ground truth prompts. The personal AI agent 302 can iterate over the training data until a loss function satisfies a stopping criterion, where at each iteration parameters of the personal AI agent 302 are updated. In this way, the personal AI agent 302 can generate real time prompts based on current information accessed or obtained by the UI components 320 to provide to the tool components 312 for generating content to provide back to the UI components 320.

In some examples, the personal AI agent 302 determines that the user is using the AR/VR device 326 and receives input via the AR device including a voice prompt specifying: "What can I cook with these ingredients?" The personal AI agent 302 accesses a camera feed on the AR/VR device 326 and identifies objects within the camera feed, which include potatoes and carrots. The personal AI agent 302 accesses multimodal memory 308 for the user and finds relevant user data from a common space vector, such as a like for a friend's potato and carrot soup, a user's location in Germany on a recent trip, and a video post from the user with context relating to authenticity of recipes. The personal AI agent 302 generates a prompt from this common space vector to input into a neural network engine 314 which asks for "authentic German soup recipes that include potato and carrots." The personal AI agent 302 accesses the multimodal memory 308 and identifies that the user prefers receiving recipe instructions via the AR device, and, in response, proceeds to display recommended recipes received from the neural network engine 314 on the AR device.

In some examples, the user is looking at a particular building with AR glasses. The personal AI agent 302 detects the user's location, accesses the multimodal memory 308, and determines from a common vector that the user has a dentist appointment in the building. The personal AI agent 302 displays a pop-up notification on the AR device on whether the user would like directions to the dentist office. In response to receiving a selection from the user for directions, the personal AI agent 302 overlays directions to the dentist office location on the AR device.

FIG. 4 is a block diagram of an example personal AI agent system 400, in accordance with some examples. The personal AI agent system 400 includes a client system 406, an intent component 414, a neural network 436, a content response component 412, a response filter component 404, an additional service 428, a user profile 416, and a personal AI configuration component 434. The user profile 416 can include some or all of the same components as user database 304. For example, the user profile 416 can include or provide access to a multimodal memory 426 which can include some or all of the components of multimodal memory 308. The client system 406 can include the same or similar components as user system 102.

In some examples, the personal AI agent system 400 is a software platform designed to simulate human decision making through use of multimodal memory 308. The personal AI agent system 400 may employ embeddings to generate the multimodal memory 426 in order to generate a user's profile 416 and apply machine learning (ML)/artificial intelligence methodologies generate recommended content for the user.

In some examples, the personal AI agent architecture comprises one or more intent components 414 which can include the same features and functions as the content response component 412. The intent component 414 can be configured to understand an intent 422 of the user 438 and extract relevant information from the user input 402, responses to recommended content 418, or from collected data that is used to generate embeddings which can be stored in the multimodal memory 426. This can be achieved by analyzing user data to generate the multimodal memories 426 and mapping the user data to an intent and/or receiving the intent from the multimodal memories 426. The intent component 414 can use various methodologies such as rule-based systems, statistical models, Large Language Models (LLMs), neural networks, and the like to understand the intent of the user.

The content response component 412 generates one or more content items 408 for presentation to the user 438. The content response component 412 uses the intent 422 received from the intent component 414 and any extracted information from the intent component 414 to determine the appropriate content items 410. This can be done using rule-based systems, decision trees, statistical models, LLMs, neural networks, and the like. In some examples, the intent component 414 and the content response component 412 are a single component and in some other cases they are part of different devices/systems. The content response component 412 generates content items in a human-like manner by using methodologies such as, but not limited to, text generation and machine learning models. Content items can be in the form of directions, stickers, text, content augmentation, other features using feature APIs 318, and/or the like.

In some examples, either the intent component 414 and/or the content response component 412 may use a neural network 436 to improve their intent understanding and content management capabilities. For example, the intent component 414 uses the neural network 436 to analyze the input of the user, multimodal memory 426 for the user 438, and extract relevant information, such as the intent of the user and entities. If the response content is text, the content response component 412 uses the neural network 436 to identify and extract important information from unstructured text, such as a question of the user 438 or a request. This can be done using methodologies such as named entity recognition, part-of-speech tagging, sentiment analysis, and the like. The content response component 412 identifies other types of content that align with the intent of the user, as further described herein.

In some examples, the intent component 414 communicates information 440 extracted or obtained from the multimodal memories 426 and/or the user input 402 and/or interaction directly to the neural network 436. The neural network 436 receives the extracted information and generates the one or more content items 410. In a similar manner, the content response component 412 may receive the intent 422 and generate a prompt based on the intent which is communicated to the neural network 436. The neural network 436 receives the prompt and generates the one or more content items 410.

The personal AI agent system 400 receives, from a client system 406, user data that can be used to determine intent of the user 438 during an interaction session. For example, the user 438 can use the client system 406 to access an interaction server that hosts the personal AI agent system 400. The user 438 interacts with a device, such as by entering a prompt as user input 402, into the client system 406 and the client system 406 communicates the user input 402 to the personal AI agent system 400. In some examples, the user input 402 may include other types of data as well as text such as, but not limited to, image data, video data, audio data, electronic documents, links to data stored on the Internet or the client system 406, and the like. In addition, the user input 402 may include media such as, but not limited to, audio media, image media, video media, textual media, and the like. Regardless of the data type of the user input 402, keyword attribution and expansion may be used to automatically generate a cluster of keywords or attributes that are associated with the received user input 402. For example, image recognition may be deployed in an automated manner to identify objects and location associated with visual media and image data and to generate a keyword cluster or cloud that is then associated with the image-based prompt.

The user input 402 or interaction may further be received through any number of interfaces and I/O components of an interaction client. These include gesture-based inputs obtained from a biometric component and inputs received via a Brain-Computer Interface (BCI). In some examples, the personal AI agent system 400 is integrated into various platforms such as, but not limited to, websites, messaging apps, and mobile apps, allowing users to interact with it through text or voice commands.

The personal AI agent system 400 determines the intent 422 of the user 438 using the information obtained from the multimodal memory 426 and the user input 402 or interaction. For example, the intent component 414 receives the information obtained from the multimodal memories 426 for the user 438, user input 402, and any user feedback including follow up messages or interactions from the user 438 and uses an intent processing pipeline to determine the intent 422. This pipeline uses machine learning models, Natural Language Processing (NLP) methodologies, or other models or methodologies to map messages or interactions to intent (such as mapping sets of conversations to a bag of intentful keywords and concepts). In addition to the keywords that are used in the original user input 402, stemmed keywords and expanded concepts are also generated. The platform also assigns a weight to each concept based on the importance of those people in the conversation, of the interaction type and characteristics of the interactions and messages, and/or the like. These keywords, interaction types, and concepts are aggregated and mapped to the user 438 as part of an intent profile or intent vector having weighted keywords and concepts based on the importance of those in the conversation.

In some examples, the personal AI agent system 400 associates a time factor to a keyword, interaction, or concept where the time factor decays in time. For example, the personal AI agent system 400 attaches a time factor to the keywords, interactions, and concepts, which indicates how fresh that concept should be used for targeting and bidding. For example, "Hotels in Cancun for spring break" vs "Planning for wedding next year" will have two different decaying factors. In some examples, the personal AI agent system 400 applies a time factor to a conversation state.

In some examples, an overall intent of the user is built using various signals or data such as user demographics, location, device, engagement with organic surfaces such as a user interface and service features provided by the interaction client of an interaction platform application and consumption patterns, and overall friend-graph proximity carrier signals or data that may be discernable from the user's affiliation with the interaction platform.

In some examples, the intent vector is an additional dimension that can be used to refresh and update an intent profile stored in the user profile 416. In some examples, the personal AI agent system 400 uses the user profile 416 that includes multimodal memory 424 of the user 438 to determine an intent of the user. In some examples, the intent component 414 uses artificial intelligence methodologies including ML models to generate the intent 422. The personal AI agent system 400 uses the data on intent of the user 438 to generate one or more content items, and receive feedback to improve its responses and optimization capabilities over time by ingesting the feedback. The personal AI agent system 400 collects engagement of the user 438 on advertisements, organic surfaces (user interfaces and services provided to users by the interaction platform) features of the interaction platforming system and also responses to the personal AI agent system 400 itself and feeds that into the intent component 414. In this way, the personal AI agent system 400 can fine-tune or further pre-train the ML models of the intent component 414 to not only take intent of the user into consideration, but also use follow up actions to fine-tune the intent of the user inference model.

In some examples, the personal AI agent system 400 collects a set of interactions (such as prompts or clicks) during an interaction session. The personal AI agent system 400 maps the set of interactions to an intent vector. The personal AI agent system 400 assigns weights to the characteristics of interactions based on an importance score to the conversation of the interactions, and determines the intent of the user based on the intent vector including the weighted characteristics of interactions. In some examples, the personal AI agent system 400 stores an interaction state in the user profile 416 as part of multimodal memory 426 of a series of interaction sessions so that the personal AI agent system 400 can have a context for interactions that occur over a plurality of interaction sessions.

In some examples, a knowledge base of the personal AI agent system 400 includes a set of information that the personal AI agent can use to understand and respond to an input or interaction of the user 438. This includes, but is not limited to, a predefined set of intents, entities, and responses, as well as external sources of information such as databases or APIs. In some examples, intent information of a friend, or friends, of the user 438 are used to understand, inform, and/or respond to a user's intent.

The personal AI agent system 400 uses a content response component 412 to generate one or more content items 410 using the intent 422. For example, the content response component 412 receives the intent 422 and communicates the intent 422 as a neural network prompt to the neural network 436. The neural network 436 receives the neural network prompt and generates the content items 410. The neural network 436 communicates the content items 410 to the content response component 412. The content response component 412 receives the content items 410 and communicates the content items 410 to the response filter component 404 for additional processing. In some examples, the content response component 412 generates the content items 410 using a set of additional services 428, such as, but not limited to, an image generation or content augmentation system. The content response component 412 generates a service request 430 using the intent 422 and communicates the service request 430 to the additional services 428. The additional services 428 uses the service request 430 to generate the request response 432 and communicates the request response 432 to the content response component 412. The content response component 412 uses the request response 432 to generate the content items 410.

In some examples, the personal AI agent system 400 uses a response filter component 404 to filter a raw content response 420 generated by the content response component 412. For example, the content response component 412 communicates the raw content response 420 to the response filter component 404 and the response filter component 404 filters the raw content response 420 based on a set of filtering criteria to eliminate specified content from the raw content response 420, for instance obscene words, images, or concepts, or content that some may consider harmful. In some examples, the response filter component 404 generates an adjusted intent 422 based on filtering the raw content response 420, and the content response component 412 generates an additional raw content response 420 using the adjusted intent 422.

In some examples, the neural network 436 and the additional services 428 are hosted by the same system that hosts other components of the personal AI agent system 400. In some examples, the neural network 436 and the additional services 428 are hosted by a server system that is separate from the system that hosts the personal AI agent system 400, and the personal AI agent system 400 communicates with the neural network 436 and the additional services 428 over a network. For example, the personal AI agent system 400 receives the user input 402 and multimodal memories 426 and communicates the user input 402 and multimodal memories 426 to the neural network 436 residing on the separate server system. The neural network 436 receives the user input 402 and multimodal memories 426 and generates a raw content response 420. The neural network 436 then communicates the raw content response 420 to the personal AI agent system 400. The personal AI agent system 400 receives the response for subsequent processing as described herein.

In some examples, as part of the content items 410, the personal AI agent system 400 generates a set of interaction options that are displayed to the user 438 by the client system 406 that prompt the user 438 to interact with the personal AI agent system 400. The interaction options generated by the personal AI agent system 400 may include chat information such as, but not limited to, context sensitive material, instructions to the user 438, possible topics of conversation, interactive digital content items, and the like. In some examples, the personal AI agent system 400 uses the interaction options to suggest chat topics to a user 438 or to guide the user 438 through certain interaction steps that the user can take, such as providing instructional material on various topics or digital content items that the user can click through. In some examples, the interaction options comprise suggestions of conversations, questions, or interaction steps that are intended to solicit a user 438 to enter a prompt or make a particular interaction with the system. The interaction options are aimed at helping the user 438 get to information they need, but provide a helpful side effect of generating additional user interactions with the personal AI agent system 400. These additional user interactions improve the ability of the personal AI agent system 400 to determine user intent by providing additional context and information to the personal AI agent system 400.

In some examples, the personal AI agent system 400 determines a personality or tone for the responses or content generated by the personal AI agent system 400. For example, the personal AI agent system 400 stores a conversation or interaction state for the user 438 as part of the user's profile stored in the user profile 416. The personal AI agent system 400 uses the conversation or interaction state and demographic or other information about the user 438 to determine a personality or tone for the user 438, such as by adopting a formal tone for an older user, and a more informal tone for a younger user.

In some examples, the user 438 specifically alters the "persona" of interactions with the personal AI agent system 400 by interacting with a personal AI configuration component 434 and specifically requesting that the personal AI agent system 400 respond or act in a specific way (e.g., "be funnier", "answer in riddles" etc.) or provide certain type of content more often than others. In addition to modifying the personality or tone of the responses, the visual interface presented by the personal AI agent system 400 may also be altered to reflect a specific "persona" of the personal AI agent system 400. In some examples, a slide toggle may be presented to enable the user 438 to select between a menu of persona traits (e.g., "cheeky", "wry", "cute", etc.)

In some examples, the system that hosts the personal AI agent system 400 may not be a component of an interaction platform but another interaction system that provides services and information to a group of users such as, but not limited to, a platform that provides enterprise wide connectivity to a group of users such as employees of a company, clients of an enterprise providing professional services, educational institutions, and the like. In some of such examples, the content provided to the users may not be advertising, but may be other types of useful information such as company policies, status messages for projects, newsworthy events, and the like.

In some examples, end-to-end encryption is used to secure communications thus ensuring that only the sender and the intended recipient can read the messages being exchanged. By implementing end-to-end encryption, the personal AI agent system 400 can provide a secure and private messaging experience for users while still extracting intent for advertising experience enhancement. In the context of intent of the user extraction, this means that once the conversation is end-to-end encrypted, the personal AI agent system 400 as an end of the conversation can decrypt messages and pass those to the intent extraction pipeline of the intent component 414. In some examples, the personal AI agent system 400 is operatively connected to an Internet search engine using the additional services 428 or the like and a user can use the personal AI agent system 400 as an intelligent search engine to search the Internet. In some examples, the personal AI agent system 400 is operatively connected to a proprietary database via the additional services 428 and a user can use the personal AI agent system 400 as an intelligent search assistant for searching the proprietary database.

In some examples, machine learning components of the intent component 414, the content response component 412, and the neural network 436 are continuously retrained or fine-tuned based on user interactions with the content items 410. For example, interactions by a user with the content items 410 are stored in an analytics database (not shown). Metrics of the interactions are then used to provide reinforcement to the content response component 412 when the content response component 412 provides a sequence of responses that lead to a successful intent 422 determination and consequently properly targeted content items 410.

In some examples, the personal AI agent system 400 uses interactions between users and the generated content from other personal AI agents as inputs into the intent component 414 and/or the content response component 412. The other personal AI agents can be sponsored personal AI agents, custom personal AI agents built by users from self-serve tools/templates, and the like.

In some examples, the information that the personal AI agent system 400 extracts from conversations or interactions is focused on the intent of the user. In addition, the personal AI agent system 400 furthers a conversation or interaction with a user by knowing that intent of the user (e.g., if the user asks for good hotels in Cancun, the personal AI agent system 400 responds with: "Here is a list of hotels. I also know of a good promotion for a hotel, would you like to see it?" or provides a 3D model of various Cancun hotels on an AR device that are of a certain type of luxury that the user is accustomed to). This provides for the intent of the user being extracted from the user 438, matching the intent to other content, and embedding that content into the content items 410. In some examples, textual components of the additional content are used to finetune the responses of the intent 422 determined by the intent component 414 and/or the content items 410 generated by the content response component 412. This improves the suggestions provided by the personal AI agent system 400 and improves user engagement.

In some examples, the personal AI agent system 400 can use an advertising content delivery and bidding component to provide advertisers an opportunity to bid on certain actions by choosing keywords or an expanded set of concepts (auto expansion) to select their potential target audience and display advertising content that will be delivered to users who match that criteria within their intent vector. Overall, by mapping conversations to a set of keywords, interactions, and concepts, and mapping those to user intent and profile, the advertising content delivery and bidding component of the personal AI agent system 400 enables advertisers to find their target audience much more precisely. In some examples, an AI-driven ad creative generation system of the personal AI agent system 400 assists advertisers by simplifying the process of creating advertising creatives and/or generating advertising creatives for the advertisers. By providing inputs such as website, target application, additional assets, and target keywords, the personal AI agent system 400 can automatically generate advertisement creatives. This can save advertisers time and resources, allowing them to focus on other aspects of their advertising campaigns.

The personal AI agent system 400 provides users with opt in/opt out options to opt out of the use of user information. The 400 can operate by default as an opt-in system. Opt-in and opt-out options are mechanisms used by the system to give users control over the use of their personal data. These options are especially significant in the era of data privacy regulations such as the General Data Protection Regulation (GDPR) and the California Consumer Privacy Act (CCPA). Below are some examples of opt-in mechanisms:

1. Opt-in: An opt-in approach requires users to actively give their consent before their personal data can be collected, processed, or shared by the application or website. This method is considered more privacy-friendly, as it ensures that users are fully aware of the data practices and intentionally choose to participate. Such opt-in options can appear as banners or pop-ups. These appear when users first visit a website or launch an application, requesting permission to collect and process personal data for specific purposes (e.g., targeted advertising, analytics, or personalization). Other opt-in options can be displayed in the form of checkboxes or toggle switches, allowing users to enable or disable data collection for specific purposes individually. In some examples, opt-in options are shown as in-context prompts, where users may encounter these when accessing particular features or functionalities within the application or website that rely on data collection (e.g., location-based services).
2. Opt-out: In an opt-out approach, the system assumes that users consent to data collection and processing by default. However, users are provided with options to withdraw their consent at any time. The system applies the opt-out approach in a limited number of circumstances.

The system provides privacy policy or settings, where users can access an application or website's privacy policy, which includes information about how to opt-out of data collection and processing, or preference options that allow users to manage their privacy settings and disable specific data collection and sharing practices. To promote transparency and user control, the systems described herein clearly communicate data collection and processing practices, and provide easy-to-use opt-in and opt-out options.

Generating and Applying Recommended Content Using Multimodal Memory

Figure 5:
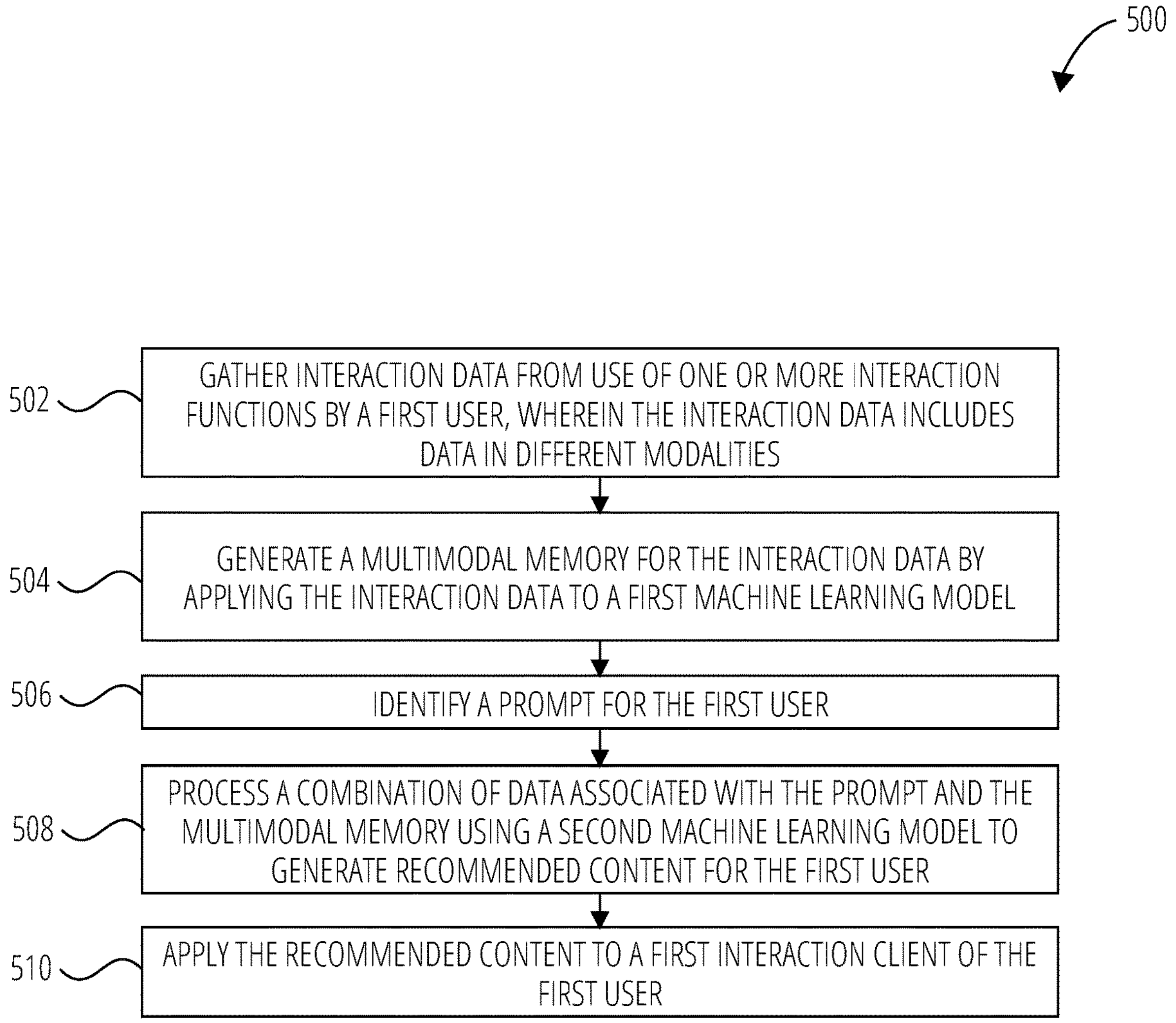
FIG. 5 illustrates an example flowchart for generating and applying recommended content via the use of multimodal memory, according to some examples.

FIG. 5 illustrates an example method 500 for generating and applying recommended content via the use of multimodal memory, according to some examples. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At operation 502, the personalized AI agent system 232 gathers interaction data from use of one or more interaction functions by a first user, wherein the interaction data includes data in different modalities, as discussed above. In some cases, interaction functions include a chat window where messages, stickers, emojis, and other media content items are shared between users. In some examples, interaction functions include users sending photos or videos to friends, either individually or in groups, which can be edited with text, stickers, filters, and drawings before being sent. In some cases, interaction functions include videos, audio, text, or other communications that disappear after certain conditions are met, such as being viewed once or setting a time limit, creating a more ephemeral and casual sharing experience.

In some cases, interaction functions include a collection of videos, messages, stickers, or other media content items that are visible to friends for a certain period of hours (e.g., 24 hours). In some cases, interaction functions include displaying media content items from other users, such as publishers, creators, and influencers, where users can explore and subscribe to different channels to receive updates on their favorite content. In some cases, interaction functions include map and location functions, such as users sharing their location with friends and viewing their friends' locations on a map, or exploring a map with points of interest by other users categorized by location and events.

Interaction functions include various filters and content augmentations to enhance images, videos, or other media content items to share with others, such as by adjusting the color or appearance or adding interactive elements such as animations and facial transformations, in real-time. Interaction functions include saving favorite media content items with other users in a private archive, where users can access these saved snaps later, edit them, or share them with friends. Interaction functions include personalized avatars which can be used as a profile picture to be viewed by others and in stickers, chat, and image/video decorations. Interaction functions include multiplayer games that users can play with their friends directly within the user interface of the system to share messages and media content items.

Interaction functions include data captured by an AR device. In some examples, the personalized AI agent system 232 captures motion and position data, such as data from accelerometers, gyroscopes, and magnetometers to track user movement or orientation. In some examples, the personalized AI agent system 232 captures eye-tracking data which monitors the user's eye movements and focus, gaze-based interactions, objects the user is focused (or not focused) on, or user attention patterns. In some examples, the personalized AI agent system 232 captures gesture and hand tracking data, such as data related to hand movements and gestures. In some examples, the personalized AI agent system 232 captures facial expressions. In some examples, the personalized AI agent system 232 captures biometric data, such as heart rate, body temperature, or skin conductivity. In some examples, the personalized AI agent system 232 captures data related to user interactions within the virtual or augmented environment, such as objects or buttons users interact with, the time spent in specific areas, or the choices users make. In some examples, the personalized AI agent system 232 captures voice data, voice recognition, voice commands, and/or the like. In some examples, the personalized AI agent system 232 captures location data, such as a user's GPS location. In some examples, the personalized AI agent system 232 captures usage data related to how and when the devices are used, session duration, frequency of use, and user engagement with specific content or applications.

At operation 504, the personalized AI agent system 232 generates a multimodal memory for the interaction data by applying the interaction data to a first machine learning model, as discussed above. The first machine learning model can be trained to generate embeddings for data in different modalities.

Embeddings of a multimodal embedding include a mathematical representation of multiple types of data or modalities, such as image, text, audio, or video data in a shared vector space. In some examples, embeddings include data coming in different formats from different devices. Interaction data includes data from the first interaction client of the first user and data from a second interaction client of the first user. The first interaction client is of a different type than the second interaction client. The first interaction client can be a mobile phone, a tablet, a smart watch, and/or an AR device. The second interaction client can be the mobile phone, the tablet, the smart watch, and/or the AR device.

One of the goals of embeddings in multimodal memory 308 is to capture the semantic relationships and similarities between different modalities, enabling the models to perform tasks that require a joint understanding of multiple types of information. In some examples, the personalized AI agent system 232 extracts, via the first machine learning model, the embeddings from the data in the different modalities and combines the extracted embeddings from different modalities into a common vector.

In some examples, the personalized AI agent system 232 applies a multimodal embedding to represent the image and the corresponding text caption in a shared vector space for an image captioning. This allows the personalized AI agent system 232 to understand the relationship between the image and its caption, which can help it generate more accurate and relevant captions for new images.

The personalized AI agent system 232 applies deep learning techniques, such as neural networks, that are trained to learn to map different modalities into a shared embedding space by optimizing a joint objective function. These techniques can leverage large amounts of labeled data and can be applied to a wide range of tasks, including image and video captioning, visual question answering, and multimodal machine translation.

In some examples, the first machine learning model is trained to extract meaningful features from each modality, such as text embeddings from textual data, visual features from images, or audio features from sound. These features can be obtained using deep learning techniques, such as pre-trained neural networks, or traditional machine learning methods, depending on the data type and application requirements. Such extracted features from different modalities are combined into a unified representation, creating a multimodal embedding. The personalized AI agent system 232 can apply various techniques, such as concatenation, fusion, or attention mechanisms. The resulting multimodal embedding captures the essential information from each modality while taking into account the relationships between them.

At operation 506, the personalized AI agent system 232 identifies a prompt for the first user. Identifying the prompt for the first user includes receiving a question or request from the first user via text or speech. The personalized AI agent system 232 identifies keywords from the prompt and applies weights to each of the identified keywords. The personalized AI agent system 232 applies the identified keywords and corresponding weights to the second machine learning model.

In some examples, the personalized AI agent system 232 generates the prompt for the first user automatically based on an intent identified from real-time interaction data captured by the first interaction client. The personalized AI agent system 232 generates prompts for a user based on a user's past activity, interests, and behavior patterns. The personalized AI agent system 232 generates personalized prompts related to topics the user may find appealing, such as if a user frequently interacts with a certain type of content about technology.

In some examples, the personalized AI agent system 232 uses popular or trending topics from the platform or the wider internet to create prompts that are likely to be of interest to a broad audience. In some examples, by utilizing a user's geographic location, the personalized AI agent system 232 can generate prompts that are relevant to their local area, such as events, news, or cultural topics. In some examples, the personalized AI agent system 232 can create prompts based on the time of day, season, or upcoming events or holidays, such as events that are time sensitive. In some examples, the personalized AI agent system 232 can use the user's social connections to generate prompts related to their friends, family, or other users they follow, such as a birthday or new connection with another user. In some examples, based on the user's activity within a specific application or AR experience, the personalized AI agent system 232 can generate prompts related to that context.

In some examples, the personalized AI agent system 232 can use the user's in-application actions, such as likes, comments, and shares, to generate prompts related to their interests. For example, if a user frequently interacts with content about cooking in a recipe application, the personalized AI agent system 232 may generate a prompt for the user's favorite dish to prepare at home. In some examples, by utilizing sensors and data from the user's mobile device or AR headset, the personalized AI agent system 232 creates context-aware prompts based on their physical environment. In some examples, the personalized AI agent system 232 can generate prompts based on real-time events occurring within the application or AR experience, such as a live-streamed event. In some examples, the real-time interaction data includes a current camera feed from a camera system of the first interaction client 104.

In some examples, the personalized AI agent system 232 uses the user's past activity, preferences, and behavior patterns within the application or AR experience to generate a prompt for the user. In some examples, the personalized AI agent system 232 gathers user profile information, such as a calendar of appointments or objects detected in a camera feed of an AR device to generate a prompt. In some examples, by incorporating gamification elements, the personalized AI agent system 232 creates prompts that encourage user participation and engagement, such as checking on a feature within a game.

At operation 508, the personalized AI agent system 232 processes a combination of data associated with the prompt and the multimodal memory using a second machine learning model to generate recommended content for the first user. The personalized AI agent system 232 uses multimodal embeddings to collect and process user information across different types of devices and provide personalized recommendations based on a prompt or user question. The personalized AI agent system 232 can clean and preprocess the interaction data to ensure that it is in a suitable format for further processing. The personalized AI agent system 232 resizes images, converts audio files to a specific format, or tokenizes text data.

In some examples, the interaction data gathered can be in different formats, such as text, images, audio, video, and/or the like. The database system configures data from multiple different databases, such as external data sources 316, that are in their own format (such as in different modalities or formats) into a single standardized format, such as in a shared common vector. For example, a caption in an image, objects detected in an image, a voice of a user, and/or the like is converted into a common vector with the caption text, identified objects, and keywords in the audio data. As such, the interaction data of different modalities and formats is automatically placed into a shared common vector to use by the second machine learning model using the standardized format (such as the common vector). Moreover, recommended content can be presented to the first user by reapplying non-standardized formatting and modalities.

The personalized AI agent system 232 trains the second machine learning model using multimodal embeddings and any available user information, such as demographic data or user preferences. This model is trained to predict user preferences or interests based on their multimodal data. Examples of such training include collaborative filtering, content-based filtering, or hybrid approaches that combine both methods.

In some examples, when a user provides a prompt or asks a question, the system extracts relevant features or information from the multimodal embeddings. The second machine learning model predicts the user's preferences or interests based on the processed prompt and the user's multimodal embeddings, which involve ranking items, estimating ratings, or predicting the probability of user engagement.

At operation 510, the personalized AI agent system 232 applies the recommended content to a first interaction client of the first user. In some examples, the recommended content is in the form of the same or different interaction function that the user first initiated or engaged with to start the method 500. The personalized AI agent system 232 processes the generated recommendations to present them to the user in a suitable format, such as a ranked list, personalized content feed, or interactive visualization.

In some examples, the recommended content is in the form of a media content item. Media content items include:

Emojis that are small images or icons that represent emotions, reactions, or objects.

Stickers that are larger images or animations that can be sent in a chat window.

Images or photographs that can be sent to other users to share visual information or document a particular event.

Video clips that can be used to share recorded content or document a particular event.

Audio messages that can be shared to communicate audible communication.

Graphics Interchange Formats (GIFs) that are short animations that can be used to add humor or express emotions.

By leveraging multimodal embeddings, the personalized AI agent system 232 creates more accurate and personalized recommendations that take into account the user's preferences and interests across different modalities and devices. Advantageously, this approach can improve user satisfaction and engagement with the recommended content, products, or services.

The personalized AI agent system 232 receives user interaction data from multiple devices and process such sensitive data on the server side. Advantageously, access to sensitive data such as camera feeds, voice commands and discussions, and other data that the user may not want to share is limited to the server side improving data security technology. Moreover, because one or more of the processes of the interaction system can be performed on the server side, remote from the interaction client (such as the AR device or mobile phone), the servers can analyze large amounts of data, run complex algorithms/processes (such as generating and applying multimodal embeddings), and have access to databases that a single interaction device may not have access to. Accordingly, this practical application is a technological improvement, as the processing can be performed without being dependent on the hardware, operating system, and/or software of interaction clients such as a mobile phone or AR device. Moreover, such processing on the server side can result in faster processing with more processing power of servers, rather than being limited to the processing power of the AR device (such as a mobile phone or AR device). Furthermore, remote processing can improve on data privacy and network communication security, as sensitive data, such as personal user data do not have to be passed to and from an interaction client over the Internet.

Knowledge Graph Data Structure for Multimodal Memory Embeddings

Figure 6:
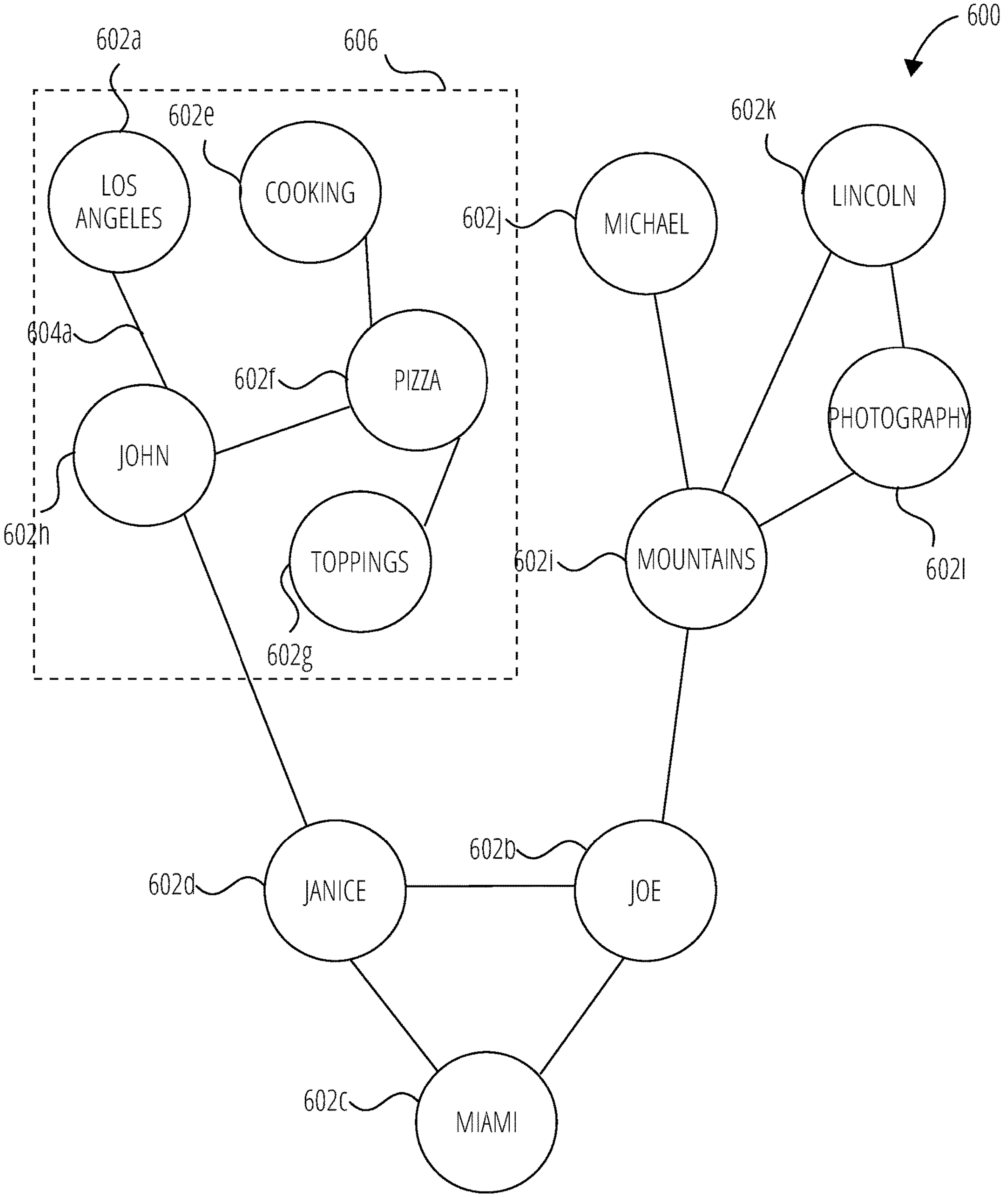
FIG. 6 illustrates a graph-based data structure of nodes and edges for multimodal memory embeddings, according to some examples.

FIG. 6 illustrates a graph-based data structure 600 of nodes and edges for multimodal memory embeddings, according to some examples. The nodes 602*a*, 602*b*, 602*c*, 602*d*, 602*c*, 602*f*, 602*g*, 602*h*, 602*i*, 602*j*, 602*k*, 6021 (collectively referred to herein as nodes 602) represent embeddings and the edges (such as edge 604*a*) (edges in FIG. 6 collectively referred to herein as edges 604) represent relationships between the nodes 602. In a knowledge graph memory for multimodal embeddings on interaction data, nodes 602 and edges 604 represent the various entities and their relationships within the context of users interacting with features on the interaction system (such as on a mobile application or AR device).

FIG. 6 illustrates a knowledge graph memory approach where information is stored using a graph-based structure, where nodes 602 represent entities, and edges 604 represent relationships between entities. Each edge has a label that describes the nature of the relationship between the connected nodes 602. In this approach, multimodal embeddings are associated with nodes 602 (entities) and edges 604 (relationships) in the knowledge graph. The embeddings capture the information from different modalities and can be used to perform reasoning, inference, or information retrieval.

The edges 604 represent relationships using edges 604 that connect nodes 602. This approach enables more complex reasoning and inference based on the structured representation of relationships between entities. It also allows for better handling of hierarchical and transitive relationships between entities. For example, the edge 604*a* connects node 602*a* with node 602*h*.

In some examples, nodes 602 include individuals who interact with the mobile application or AR device, characterized by their preferences, interests, and behavior patterns. In some examples, nodes 602 include content, such as text, images, videos, and audio shared on the platform or within the application/AR experience. In some examples, nodes 602 include specific functionalities or components of the mobile applications or AR device that the user interacts with, such as search, filters, social interactions, or navigation tools.

In some examples, nodes 602 include themes, subjects, or categories related to the content, features, or user interests. In some examples, nodes 602 include geographic information, such as user location or content related to specific places. In some examples, nodes 602 include timestamps or temporal information associated with user interactions, content creation, or events. In some examples, nodes 602 include real-world or virtual events that users may participate in or engage with through the application or AR device. In some examples, nodes 602 include social connections, such as friends, followers, or other users that a person interacts with on the platform.

In some examples, edges 604 include relationships between users and content, such as likes, shares, comments, or views. In some examples, edges 604 include relationships between users and the application or AR features, representing their usage or preferences for certain functionalities. In some examples, edges 604 include relationships between users and topics, indicating their interests or areas of expertise. In some examples, edges 604 include relationships between content and topics, describing the themes or subjects associated with each piece of content. In some examples, edges 604 include relationships between content and application/AR features, reflecting how content is accessed, manipulated, or shared using specific functionalities.

In some examples, edges 604 include relationships between users and locations, representing their geographic context or content preferences related to specific places. In some examples, edges 604 include relationships between content and locations, indicating the geographic relevance of a particular piece of content. In some examples, edges 604 include relationships between users and timestamps, capturing patterns in their activity or interactions over time. In some examples, edges 604 include relationships between content and timestamps, showing when content was created, shared, or interacted with.

In some examples, edges 604 include relationships between users and events, reflecting their attendance, interest, or engagement with specific events. In some examples, edges 604 include relationships between content and events, linking pieces of content to relevant real-world or virtual happenings. In some examples, edges 604 include relationships between users and their social connections, capturing friendships, followers, or other interactions on the platform.

In some examples, node 602*a* represents a user (John) and node 602*h* represents a particular location (Los Angeles).

The edge 604*a* that connects node 602*a* and node 602*h* indicates a geographic user preference for the particular location that node 602*h* is linked with.

By constructing a knowledge graph memory with nodes 602 and edges 604 representing these entities and relationships, the multimodal embeddings capture the complex interactions among users, content, features, and other aspects of the interaction data. This information can then be leveraged by the personalized AI agent system 232 to generate more relevant and personalized content recommendations or improve various application/AR experiences.

When the personalized AI agent system 232 generates a knowledge graph multimodal memory from user data gathered across different modalities, the personalized AI agent system 232 leverages this structured representation to provide a recommended custom response to a user prompt. The personalized AI agent system 232 receives or generates a prompt and constructs a graph query that can be used to retrieve relevant information from the knowledge graph. This query can include nodes 602 (entities) and edges 604 (relationships) that correspond to the user's request.

The personalized AI agent system 232 executes the graph query to retrieve relevant nodes 602 and edges 604 from the knowledge graph. This can be performed by using graph traversal algorithms, graph search, or graph pattern matching. The retrieved subgraph, such as subgraph 606, contains relevant entities and relationships associated with the user's prompt. In some examples, the system receives a prompt from John asking for restaurant recommendations. The system identifies John as the user (node 602*h*) and identifies that John lives in Los Angeles (node 602*a*), enjoys pizza (node 602*f*), likes to cook (node 602*c*), and enjoys pizza with certain types of toppings (node 602*g*). The personalized AI agent system 232 identifies these nodes as the subgraph 606, and responds with a recommendation of a pizza restaurant in Los Angeles where the restaurant sells pizza with toppings that John likes and that sells pizza that is a similar style as home-cooked Italian pizza. The personalized AI agent system 232 identifies that Janice (node 602*d*) is not relevant to the prompt.

The personalized AI agent system 232 combines the multimodal embeddings of the retrieved nodes 602 and edges 604 to create a unified representation of the relevant information. The personalized AI agent system 232 can apply concatenation, fusion, or attention mechanisms to combine multimodal embeddings. The resulting representation captures the essential information from each modality while taking into account the relationships between them.

The personalized AI agent system 232 uses the fused multimodal representation to generate a custom response for the user. The personalized AI agent system 232 applies natural language generation, such as sequence-to-sequence models, template-based methods, or rule-based systems, depending on the application and desired level of detail in the response.

The personalized AI agent system 232 processes the generated response to present the recommended response to the user in a suitable format, such as text, image, or a combination of different modalities. By utilizing the knowledge graph multimodal memory, the personalized AI agent system 232 provides a recommended custom response to the user's prompt that takes into account the rich and structured information stored in the knowledge graph. This approach leads to more accurate, personalized, and context-aware responses that cater to the user's needs and preferences.

Entity-Based Data Structure for Multimodal Memory Embeddings

Figure 7:
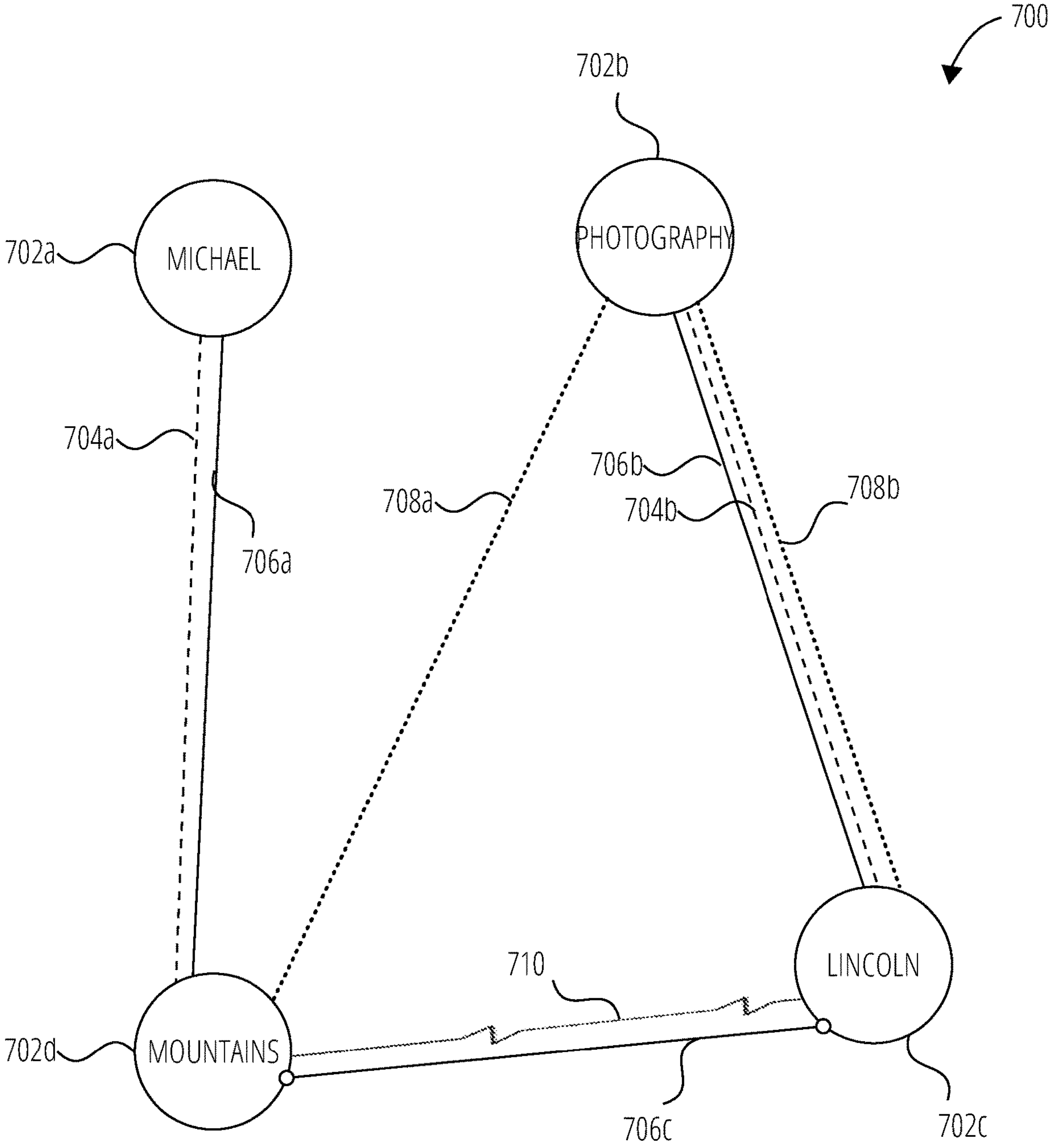
FIG. 7 illustrates a graph-based data structure of entities for multimodal memory embeddings, according to some examples.

FIG. 7 illustrates a graph-based data structure 700 of entities for multimodal memory embeddings, according to some examples. Each data structure of entities includes attributes corresponding to the individual entity and relationships with other entities.

The example of FIG. 7 focuses on storing information about entities, such as objects, people, or places, along with their attributes and relationships to other entities. This memory representation is organized as a set of memory slots or cells, where each slot represents an entity or a specific aspect of an entity.

In the example approach of FIG. 7, multimodal embeddings for each entity are stored in the memory cells, which can be retrieved or updated based on the input data. The memory cells store additional information, such as the modality or context in which the entity is observed.

The entity-based memory of FIG. 7 models relationships between entities through attention mechanisms or similarity measures. Given a query, the model retrieves relevant entities from memory based on their similarity or attention scores, which represent the strength of the relationship between the query and the memory cells.

In an edge-based memory approach for multimodal embeddings on interaction data, the memory is organized as a set of discrete edges (such as edges 704*a*, 704*b*, 706*a*, 706*b*, 706*c*, 708*a*, 708*b*, 710) connecting entities (such as entities 702*a*, 702*b*, 702*d*, 702*c*) (collectively referred to herein as entities 702). Each edge captures the relationship between two entities and stores relevant information about their interaction. When applied to interaction data of users interacting with various features on a mobile application or AR device, the personalized AI agent system 232 stores the type of interaction between entities 702, such as like, share, comment, view, or follow on the edges. In some examples, the personalized AI agent system 232 stores a measure of the strength or frequency of the interaction between entities 702, which could be represented by numerical values or categorical levels (e.g., high, medium, low) on the edges.

In some examples, the personalized AI agent system 232 stores the specific context of the interaction, such as the application feature used, the topic of the content, or the location of the user or content on the edges. In some examples, the personalized AI agent system 232 stores timestamps or temporal information related to the interaction, such as when it occurred or the duration of the interaction on the edges. In some examples, the personalized AI agent system 232 stores information extracted from different modalities (text, image, audio, video) associated with the interaction and the particular modality type on the edges, such as text features from comments, image features from shared images, or audio features from voice messages.

In the example illustrated in FIG. 7, edges 704*a*, 704*b* represent a hobby. Edge 704*a* indicates that Michael (entity 702*a*) has an interest in mountains (entity 702*d*) and edge 704*b* indicates that Lincoln (entity 702*c*) has an interest in photography (entity 702*b*). Edges 704*a*, 704*b* represent a time period. Edge 704*a* indicates that Michael (entity 702*a*) has been involved with mountains (entity 702*d*) for 8 years and edge 704*b* indicates that Lincoln (entity 702*c*) has been involved with photography (entity 702*b*) for 10 years.

By storing this information in the edges of the memory, the multimodal embeddings can effectively capture the complex relationships and interactions among users, content, and features within the social media data. This edge-based memory representation can then be used by machine learning models to provide more personalized and relevant content recommendations, enhance user experiences, and support various applications/AR functionalities.

When the personalized AI agent system 232 generates an entity-based multimodal memory from user data gathered across different modalities, the system uses this memory to provide a recommended custom response to a user prompt. The personalized AI agent system 232 processes the user prompt to extract relevant features or information. The personalized AI agent system 232 calculates the similarity or attention scores between the user's prompt and the memory cells in the entity-based multimodal memory. The personalized AI agent system 232 can apply cosine similarity, dot product, or attention mechanisms to calculate such scores. Based on these scores, the system retrieves the most relevant memory cells that contain information related to the user's prompt.

The personalized AI agent system 232 combines the multimodal embeddings of the retrieved memory cells to create a unified representation of the relevant information. The personalized AI agent system 232 applies concatenation, fusion, or attention mechanisms to combine the embeddings. The resulting representation captures the essential information from each modality while taking into account the relationships between them.

The personalized AI agent system 232 uses the fused multimodal representation to generate a custom response for the user. The personalized AI agent system 232 applies sequence-to-sequence models, template-based methods, or rule-based systems to generate the custom response. The personalized AI agent system 232 processes the generated response to present it to the user in a suitable format, such as text, image, or a combination of different modalities.

Data Architecture

Figure 8:
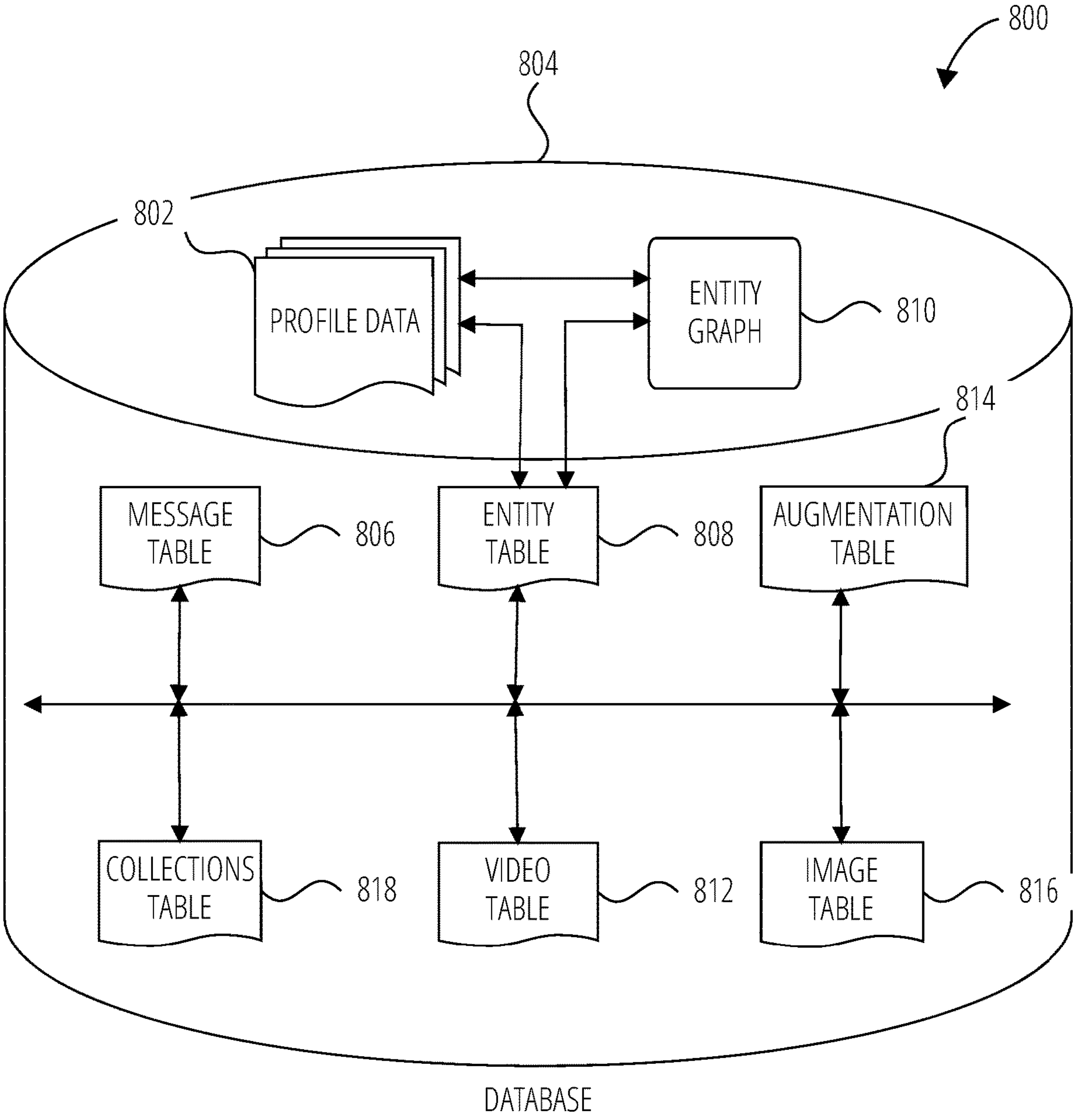
FIG. 8 is a diagrammatic representation of a data structure as maintained in a database, according to some examples.

FIG. 8 is a schematic diagram illustrating data structures 800, which may be stored in the database 804 of the interaction server system 110, according to certain examples. While the content of the database 804 is shown to comprise multiple tables, it will be appreciated that the data could be stored in other types of data structures (e.g., as an object-oriented database).

The database 804 includes message data stored within a message table 806. This message data includes, for any particular message, at least message sender data, message recipient (or receiver) data, and a payload. Further details regarding information that may be included in a message, and included within the message data stored in the message table 806, are described below with reference to FIG. 8.

An entity table 808 stores entity data, and is linked (e.g., referentially) to an entity graph 810 and profile data 802. Entities for which records are maintained within the entity table 808 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 810 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 808. Such privacy settings may be applied to all types of relationships within the context of the interaction system 100, or may selectively be applied to certain types of relationships.

The profile data 802 stores multiple types of profile data about a particular entity. The profile data 802 may be selectively used and presented to other users of the interaction system 100 based on privacy settings specified by a particular entity. Where the entity is an individual, the profile data 802 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 802 for the group may similarly include one or more avatar representations associated with the group, in addition to the group name, members, and various settings (e.g., notifications) for the relevant group.

The database 804 also stores augmentation data, such as overlays or filters, in an augmentation table 814. The augmentation data is associated with and applied to videos (for which data is stored in a video table 812) and images (for which data is stored in an image table 816).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process.

Examples of data filters include current temperature at a specific location, a current speed at which a sending user is traveling, battery life for a user system 102, or the current time.

Other augmentation data that may be stored within the image table 816 includes augmented reality content items (e.g., corresponding to applying “lenses” or augmented reality experiences). An augmented reality content item may be a real-time special effect and sound that may be added to an image or a video.

A collections table 818 stores data regarding collections of messages and associated image, video, or audio data, which are compiled into a collection (e.g., a story or a gallery). The creation of a particular collection may be initiated by a particular user (e.g., each user for which a record is maintained in the entity table 808). A user may create a “personal story” in the form of a collection of content that has been created and sent/broadcast by that user. To this end, the user interface of the interaction client 104 may include an icon that is user-selectable to enable a sending user to add specific content to his or her personal story.

A collection may also constitute a “live story,” which is a collection of content from multiple users that is created manually, automatically, or using a combination of manual and automatic techniques. For example, a “live story” may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a “live story” told from a community perspective.

A further type of content collection is known as a “location story,” which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 812 stores video data that, in some examples, is associated with messages for which records are maintained within the message table 806. Similarly, the image table 816 stores image data associated with messages for which message data is stored in the entity table 808. The entity table 808 may associate various augmentations from the augmentation table 814 with various images and videos stored in the image table 816 and the video table 812.

Data Communications Architecture

Figure 9:
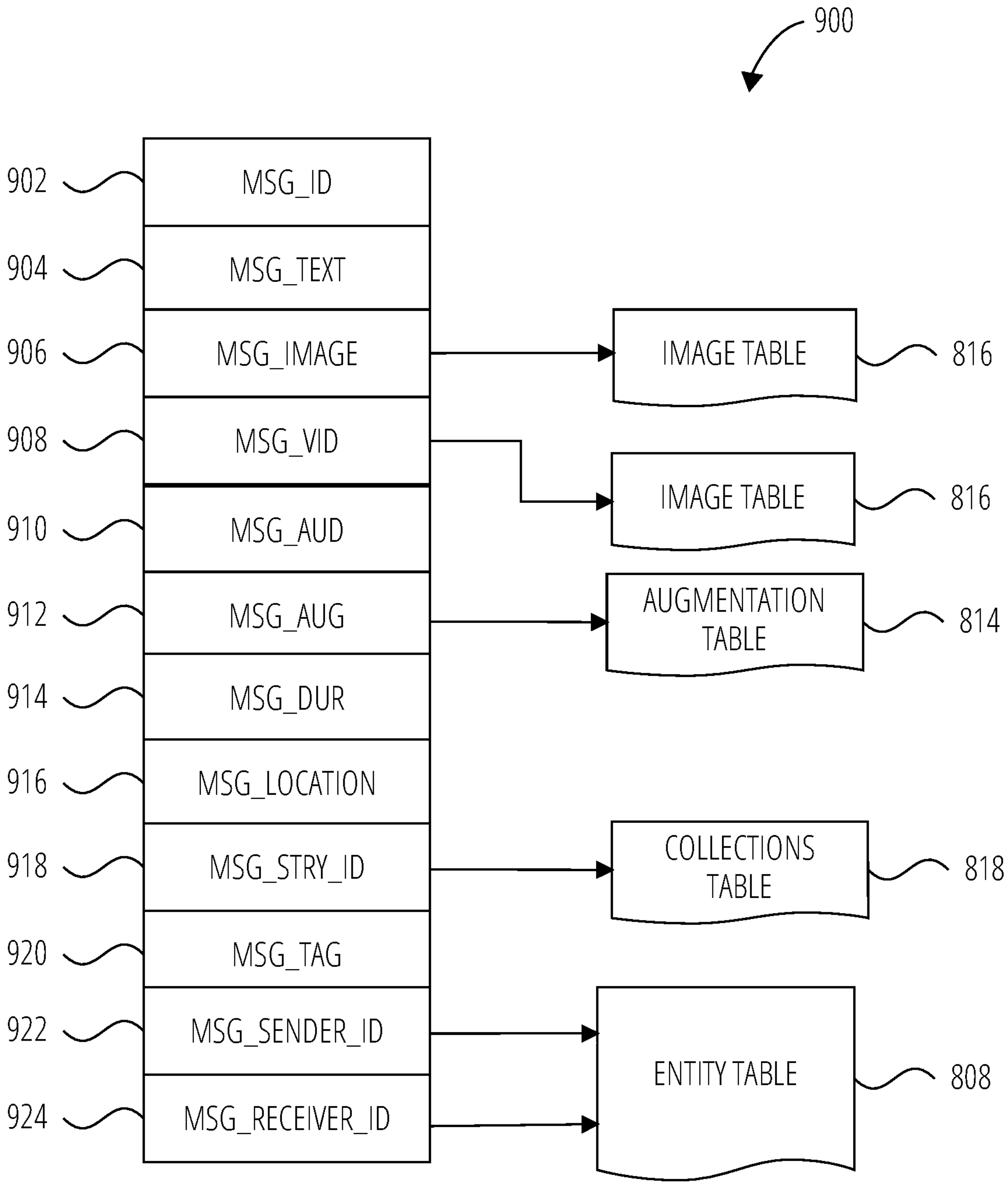
FIG. 9 is a diagrammatic representation of a message, according to some examples.

FIG. 9 is a schematic diagram illustrating a structure of a message 900, according to some examples, generated by an interaction client 104 for communication to a further interaction client 104 via the interaction servers 124. The content of a particular message 900 is used to populate the message table 806 stored within the database 804, accessible by the interaction servers 124. Similarly, the content of a message 900 is stored in memory as “in-transit” or “in-flight” data of the user system 102 or the interaction servers 124. A message 900 is shown to include the following example components:

- Message identifier 902: a unique identifier that identifies the message 900.
- Message text payload 904: text, to be generated by a user via a user interface of the user system 102, and that is included in the message 900.
- Message image payload 906: image data, captured by a camera component of a user system 102 or retrieved from a memory component of a user system 102, and that is included in the message 900. Image data for a sent or received message 900 may be stored in the image table 816.
- Message video payload 908: video data, captured by a camera component or retrieved from a memory component of the user system 102, and that is included in the message 900. Video data for a sent or received message 900 may be stored in the image table 816.
- Message audio payload 910: audio data, captured by a microphone or retrieved from a memory component of the user system 102, and that is included in the message 900.
- Message augmentation data 912: augmentation data (e.g., filters, stickers, or other annotations or enhancements) that represents augmentations to be applied to message image payload 906, message video payload 908, or message audio payload 910 of the message 900. Augmentation data for a sent or received message 900 may be stored in the augmentation table 814.
- Message duration parameter 914: parameter value indicating, in seconds, the amount of time for which content of the message (e.g., the message image payload 906, message video payload 908, message audio payload 910) is to be presented or made accessible to a user via the interaction client 104.
- Message geolocation parameter 916: geolocation data (e.g., latitudinal and longitudinal coordinates) associated with the content payload of the message. Multiple message geolocation parameter 916 values may be included in the payload, each of these parameter values being associated with respect to content items included in the content (e.g., a specific image within the message image payload 906, or a specific video in the message video payload 908).
- Message story identifier 918: identifier values identifying one or more content collections (e.g., “stories” identified in the collections table 818) with which a particular content item in the message image payload 906 of the message 900 is associated. For example, multiple images within the message image payload 906 may each be associated with multiple content collections using identifier values.
- Message tag 920: each message 900 may be tagged with multiple tags, each of which is indicative of the subject matter of content included in the message payload. For example, where a particular image included in the message image payload 906 depicts an animal (e.g., a lion), a tag value may be included within the message tag 920 that is indicative of the relevant animal. Tag values may be generated manually, based on user input, or may be automatically generated using, for example, image recognition.
- Message sender identifier 922: an identifier (e.g., a messaging system identifier, email address, or device identifier) indicative of a user of the user system 102 on which the message 900 was generated and from which the message 900 was sent.
- Message receiver identifier 924: an identifier (e.g., a messaging system identifier, email address, or device identifier) indicative of a user of the user system 102 to which the message 900 is addressed.

The contents (e.g., values) of the various components of message 900 may be pointers to locations in tables within which content data values are stored. For example, an image value in the message image payload 906 may be a pointer to (or address of) a location within an image table 816. Similarly, values within the message video payload 908 may point to data stored within an image table 816, values stored within the message augmentation data 912 may point to data stored in an augmentation table 814, values stored within the message story identifier 918 may point to data stored in a collections table 818, and values stored within the message sender identifier 922 and the message receiver identifier 924 may point to user records stored within an entity table 808.

System with Head-Wearable Apparatus

Figure 10:
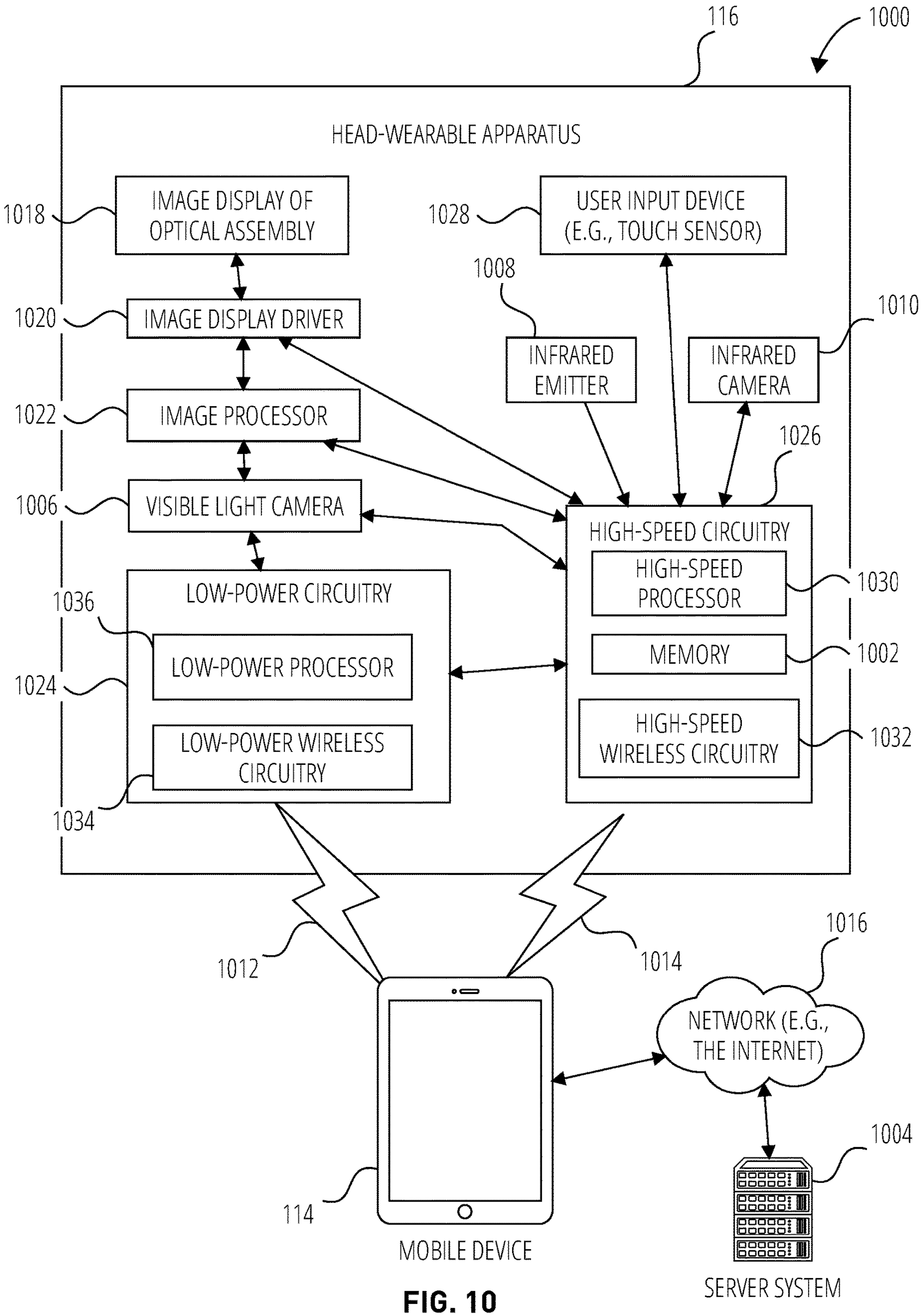
FIG. 10 illustrates a system in which the head-wearable apparatus, according to some examples.

FIG. 10 illustrates a system 1000 including a head-wearable apparatus 116 with a selector input device, according to some examples. FIG. 10 is a high-level functional block diagram of an example head-wearable apparatus 116 communicatively coupled to a mobile device 114 and various server systems 1004 (e.g., the interaction server system 110) via various networks 108. The networks 108 may include any combination of wired and wireless connections.

The head-wearable apparatus 116 includes one or more cameras, each of which may be, for example, a visible light camera 1006, an infrared emitter 1008, and an infrared camera 1010.

An interaction client, such as a mobile device 114 connects with head-wearable apparatus 116 using both a low-power wireless connection 1012 and a high-speed wireless connection 1014. The mobile device 114 is also connected to the server system 1004 and the network 1016.

The head-wearable apparatus 116 further includes two image displays of the image display of optical assembly 1018. The two image displays of optical assembly 1018 include one associated with the left lateral side and one associated with the right lateral side of the head-wearable apparatus 116. The head-wearable apparatus 116 also includes an image display driver 1020, an image processor 1022, low-power circuitry 1024, and high-speed circuitry 1026. The image display of optical assembly 1018 is for presenting images and videos, including an image that can include a graphical user interface to a user of the head-wearable apparatus 116.

The image display driver 1020 commands and controls the image display of optical assembly 1018. The image display driver 1020 may deliver image data directly to the image display of optical assembly 1018 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1028 (e.g., touch sensor or push button), including an input surface on the head-wearable apparatus 116. The user input device 1028 (e.g., touch sensor or push button) is to receive from the user an input selection to manipulate the graphical user interface of the presented image.

The components shown in FIG. 10 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1006 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1002, which stores instructions to perform a subset or all of the functions described herein. The memory 1002 can also include storage device.

As shown in FIG. 10, the high-speed circuitry 1026 includes a high-speed processor 1030, a memory 1002, and high-speed wireless circuitry 1032. In some examples, the image display driver 1020 is coupled to the high-speed circuitry 1026 and operated by the high-speed processor 1030 in order to drive the left and right image displays of the image display of optical assembly 1018. The high-speed processor 1030 may be any processor capable of managing high-speed communications and operation of any general computing system needed for the head-wearable apparatus 116. The high-speed processor 1030 includes processing resources needed for managing high-speed data transfers on a high-speed wireless connection 1014 to a wireless local area network (WLAN) using the high-speed wireless circuitry 1032. In certain examples, the high-speed processor 1030 executes an operating system such as a LINUX operating system or other such operating system of the head-wearable apparatus 116, and the operating system is stored in the memory 1002 for execution. In addition to any other responsibilities, the high-speed processor 1030 executing a software architecture for the head-wearable apparatus 116 is used to manage data transfers with high-speed wireless circuitry 1032. In certain examples, the high-speed wireless circuitry 1032 is configured to implement Institute of Electrical and Electronic Engineers (IEEE) 802.11 communication standards, also referred to herein as WI-FI®. In some examples, other high-speed communications standards may be implemented by the high-speed wireless circuitry 1032.

The low-power wireless circuitry 1034 and the high-speed wireless circuitry 1032 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1012 and the high-speed wireless connection 1014, may be implemented using details of the architecture of the head-wearable apparatus 116, as can other elements of the network 1016.

The memory 1002 includes any storage device capable of storing various data and applications, including, among other things, camera data generated by the left and right visible light cameras 1006, the infrared camera 1010, and the image processor 1022, as well as images generated for display by the image display driver 1020 on the image displays of the image display of optical assembly 1018. While the memory 1002 is shown as integrated with high-speed circuitry 1026, in some examples, the memory 1002 may be an independent standalone element of the head-wearable apparatus 116. In certain such examples, electrical routing lines may provide a connection through a chip that includes the high-speed processor 1030 from the image processor 1022 or the low-power processor 1036 to the memory 1002. In some examples, the high-speed processor 1030 may manage addressing of the memory 1002 such that the low-power processor 1036 will boot the high-speed processor 1030 any time that a read or write operation involving memory 1002 is needed.

As shown in FIG. 10, the low-power processor 1036 or high-speed processor 1030 of the head-wearable apparatus 116 can be coupled to the camera (visible light camera 1006, infrared emitter 1008, or infrared camera 1010), the image display driver 1020, the user input device 1028 (e.g., touch sensor or push button), and the memory 1002.

The head-wearable apparatus 116 is connected to a host computer. For example, the head-wearable apparatus 116 is paired with the mobile device 114 via the high-speed wireless connection 1014 or connected to the server system 1004 via the network 1016. The server system 1004 may be one or more computing devices as part of a service or network computing system, for example, that includes a processor, a memory, and network communication interface to communicate over the network 1016 with the mobile device 114 and the head-wearable apparatus 116.

The mobile device 114 includes a processor and a network communication interface coupled to the processor. The network communication interface allows for communication over the network 1016, low-power wireless connection 1012, or high-speed wireless connection 1014. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1020. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1004, such as the user input device 1028, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1012 and high-speed wireless connection 1014 from the mobile device 114 via the low-power wireless circuitry 1034 or high-speed wireless circuitry 1032.

Machine Architecture

Figure 11:
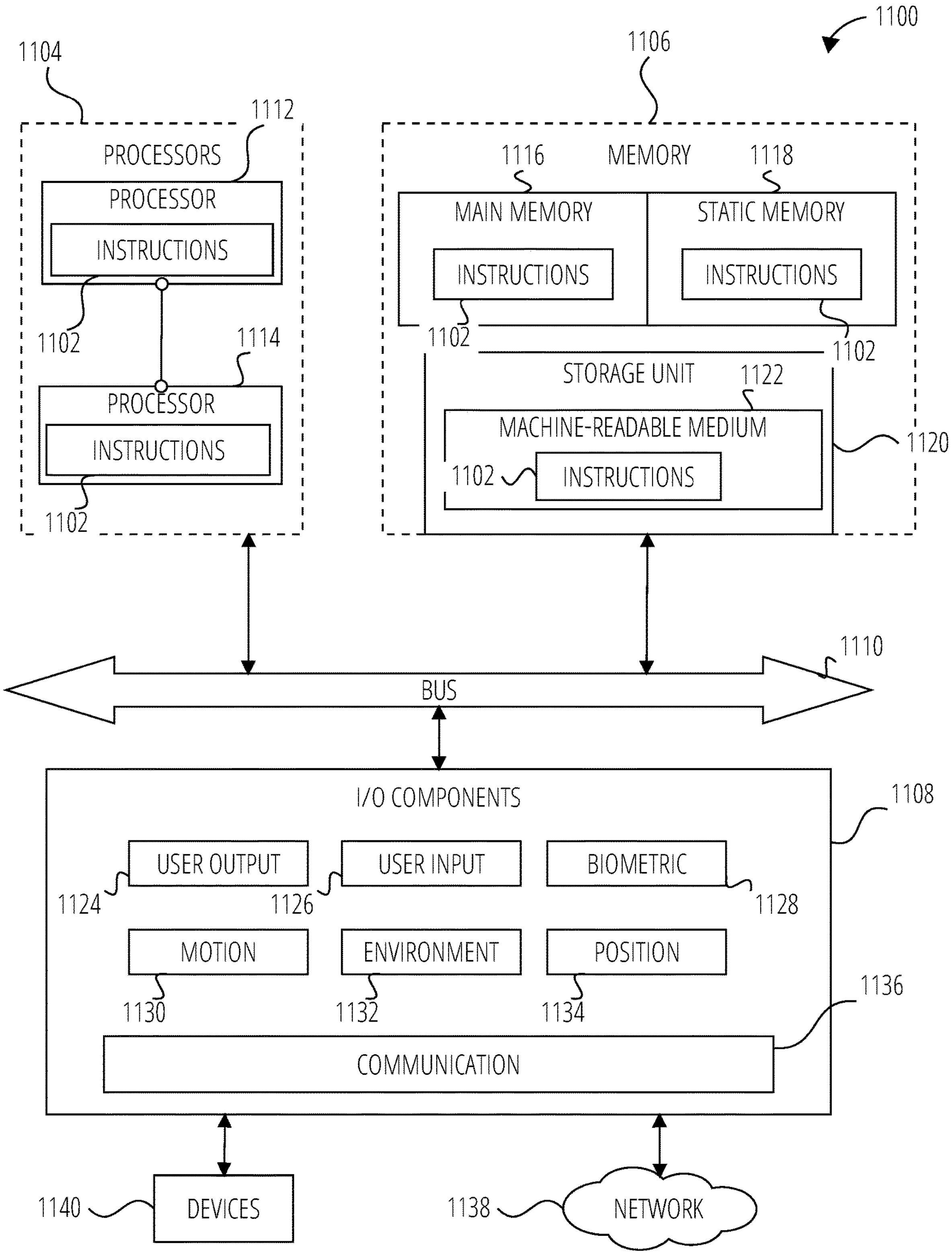
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
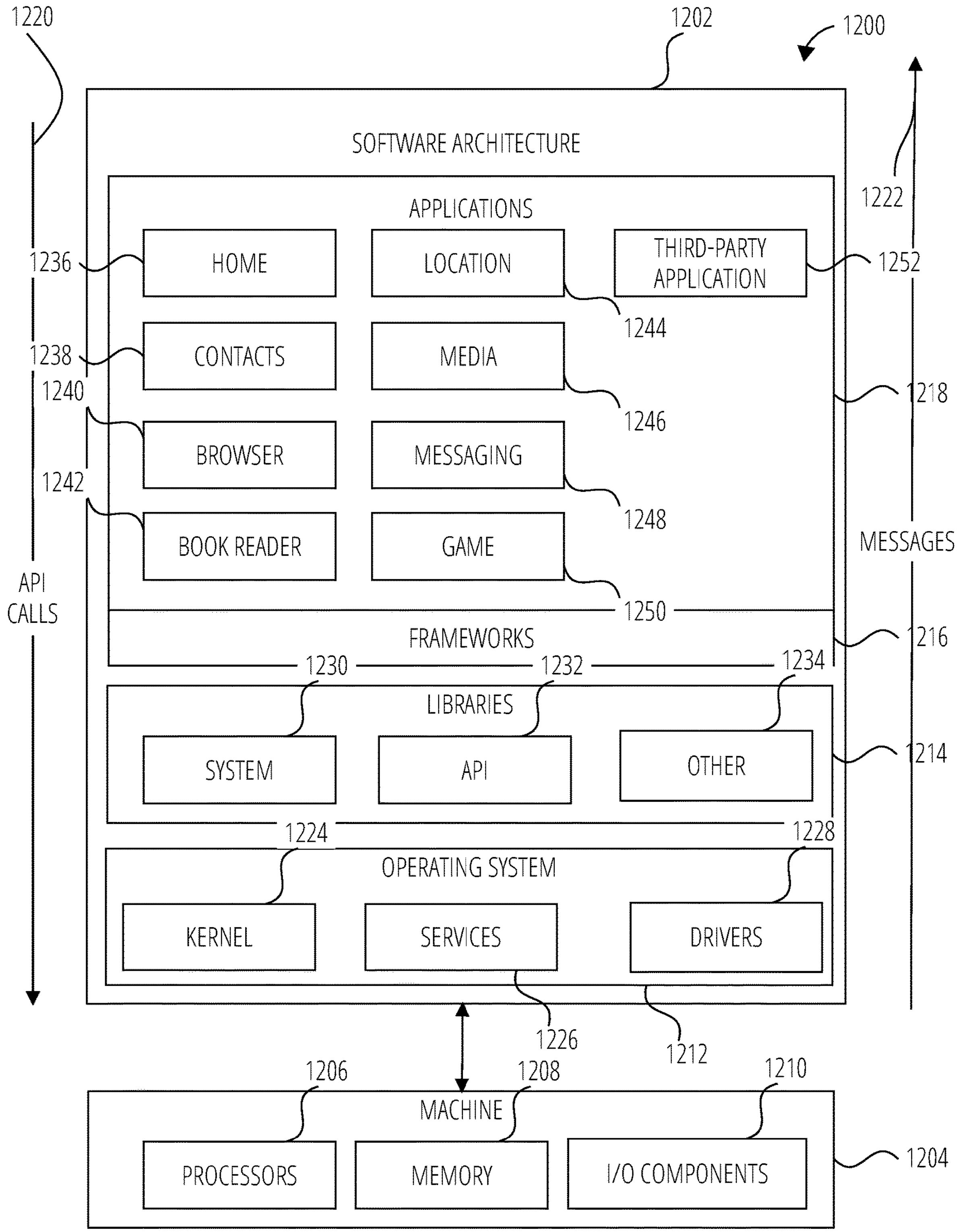
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

Machine-Learning Pipeline

Figure 14:
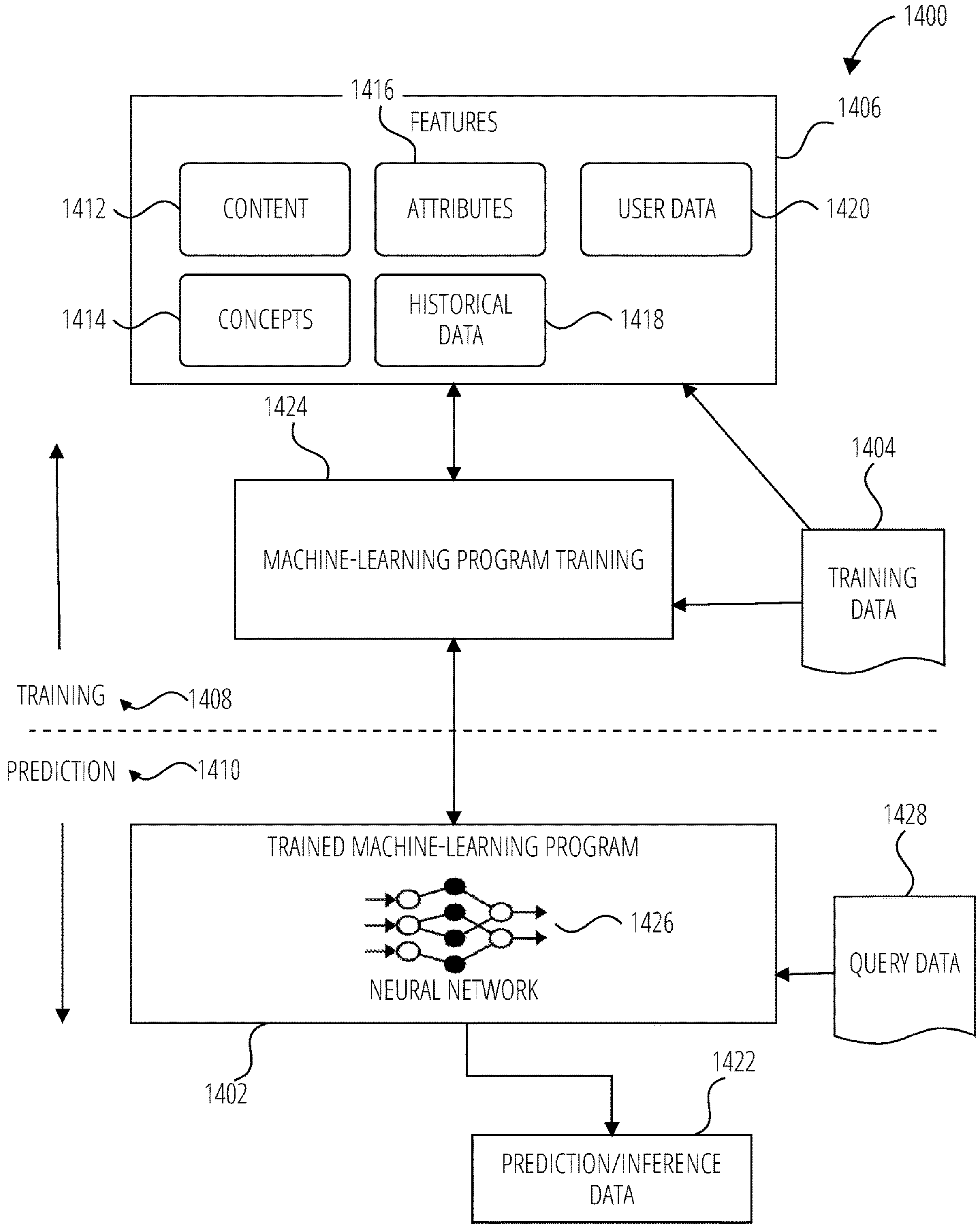
FIG. 14 illustrates training and use of a machine-learning program, according to some examples.

FIG. 14 is a flowchart depicting a machine-learning pipeline 1400, according to some examples. The machine-learning pipelines 1400 may be used to generate a trained model, for example the trained machine-learning program 1402 of FIG. 14, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 13:
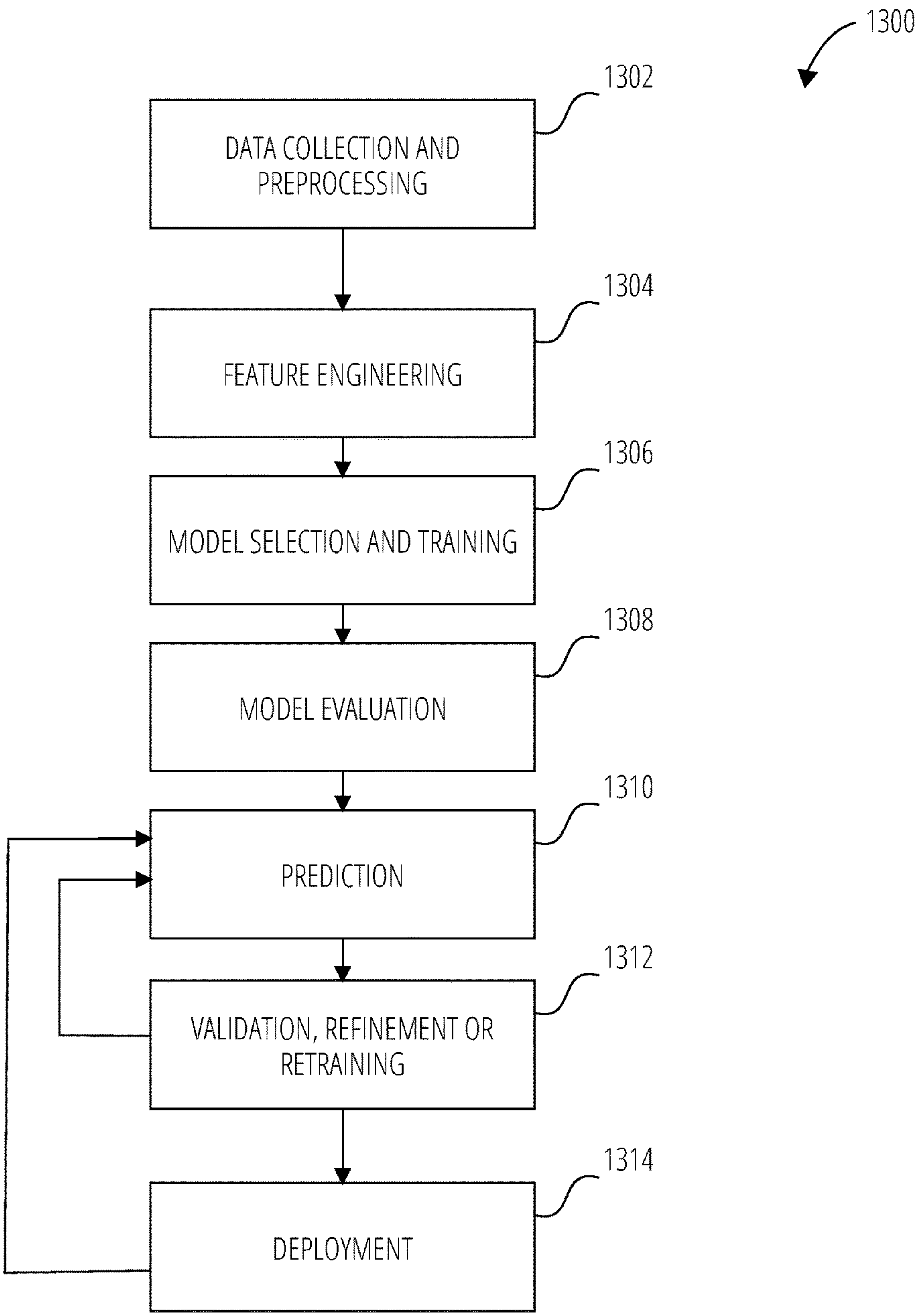
FIG. 13 illustrates a machine-learning pipeline, according to some examples.

Generating a trained machine-learning program 1402 may include multiple types of phases that form part of the machine-learning pipeline 1400, including for example the following phases 1300 illustrated in FIG. 13:

- Data collection and preprocessing 1302: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.
- Feature engineering 1304: This may include selecting and transforming the training data 1404 to create features that are useful for predicting the target variable. Feature engineering may include (1) receiving features 1406 (e.g., as structured or labeled data in supervised learning) and/or (2) identifying features 1406 (e.g., unstructured or unlabeled data for unsupervised learning) in training data 1404.
- Model selection and training 1306: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.
- Model evaluation 1308: This may include evaluating the performance of a trained model (e.g., the trained machine-learning program 1402) on a separate testing dataset. This can help determine if the model is overfitting or underfitting and if it is suitable for deployment.
- Prediction 1310: This involves using a trained model (e.g., trained machine-learning program 1402) to generate predictions on new, unseen data.
- Validation, refinement or retraining 1312: This may include updating a model based on feedback generated from the prediction phase, such as new data or user feedback.
- Deployment 1314: This may include integrating the trained model (e.g., the trained machine-learning program 1402) into a larger system or application, such as a web service, mobile app, or IoT device. This can involve setting up APIs, building a user interface, and ensuring that the model is scalable and can handle large volumes of data.

FIG. 14 illustrates two example phases, namely a training phase 1408 (part of the model selection and trainings 1306) and a prediction phase 1410 (part of prediction 1310). Prior to the training phase 1408, feature engineering 1304 is used to identify features 1406. This may include identifying informative, discriminating, and independent features for the effective operation of the trained machine-learning program 1402 in pattern recognition, classification, and regression. In some examples, the training data 1404 includes labeled data, which is known data for pre-identified features 1406 and one or more outcomes.

Each of the features 1406 may be a variable or attribute, such as individual measurable property of a process, article, system, or phenomenon represented by a data set (e.g., the training data 1404). Features 1406 may also be of different types, such as numeric features, strings, vectors, matrices, encodings, and graphs, and may include one or more of content 1412, concepts 1414, attributes 1416, historical data 1418 and/or user data 1420, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1408, the machine-learning pipeline 1400 uses the training data 1404 to find correlations among the features 1406 that affect a predicted outcome or prediction/inference data 1422.

With the training data 1404 and the identified features 1406, the trained machine-learning program 1402 is trained during the training phase 1408 during machine-learning program training 1424. The machine-learning program training 1424 appraises values of the features 1406 as they correlate to the training data 1404. The result of the training is the trained machine-learning program 1402 (e.g., a trained or learned model).

Further, the training phase 1408 may involve machine learning, in which the training data 1404 is structured (e.g., labeled during preprocessing operations), and the trained machine-learning program 1402 implements a relatively simple neural network 1426 capable of performing, for example, classification and clustering operations. In other examples, the training phase 1408 may involve deep learning, in which the training data 1404 is unstructured, and the trained machine-learning program 1402 implements a deep neural network 1426 that is able to perform both feature extraction and classification/clustering operations.

A neural network 1426 may, in some examples, be generated during the training phase 1408, and implemented within the trained machine-learning program 1402. The neural network 1426 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1426 operationally computes a small function, such as an activation function, that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1426 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1408, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1426 is iteratively trained by adjusting model parameters to minimize a specific loss function or maximize a certain objective. The system can continue to train the neural network 1426 by adjusting parameters based on the output of the validation, refinement, or retraining block 1312, and rerun the prediction 1310 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1426 even after deployment 1314 of the neural network 1426. The neural network 1426 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1410, the trained machine-learning program 1402 uses the features 1406 for analyzing query data 1428 to generate inferences. outcomes or predictions, as examples of a prediction/inference data 1422. For example, during prediction phase 1410, the trained machine-learning program 1402 is used to generate an output. Query data 1428 is provided as an input to the trained machine-learning program 1402, and the trained machine-learning program 1402 generates the prediction/inference data 1422 as output, responsive to receipt of the query data 1428. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 1402 may be a generative AI model. Generative AI is a term that may refer to any type of artificial intelligence that can create new content from training data 1404. For example, generative AI can produce text, images, video, audio, code or synthetic data that are similar to the original data but not identical.

Some of the techniques that may be used in generative AI are:

- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.
- Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.
- Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1422 that is output include trend assessment and predictions, translations, summaries, image or video recognition and categorization, natural language processing, face recognition, user sentiment assessments, advertisement targeting and optimization, voice recognition, or media content generation, recommendation, and personalization.

Training of models, such as artificial intelligence models, is necessarily rooted in computer technology, and improves modeling technology by using training data to train such models and thereafter applying the models to new inputs to make inferences on the new inputs. Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new and unseen data (such as new interaction data) and make predictions that the model was trained for based on the weights or scores that were adjusted during training. Such training of the machine learning models described herein reduces false positives and increases the performance of such models.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; at least one memory component storing instructions that, when executed by the at least one processor, cause the at least one processor to perform operations comprising: gathering interaction data from use of one or more interaction functions by a first user, wherein the interaction data includes, data in different modalities; generating a multimodal memory for the interaction data by applying the interaction data to a first machine learning model; identifying a prompt for the first user; processing a combination of data associated with the prompt and the multimodal memory using a second machine learning model to generate recommended content for the first user; and applying the recommended content to a first interaction client of the first user.

In Example 2, the subject matter of Example 1 includes, wherein the first machine learning model is trained to generate embeddings for data in different modalities.

In Example 3, the subject matter of Examples 1-2 includes, wherein the operations further comprise: training the first machine learning model by: identifying interaction training data and expected multimodal memory training data for the interaction training data; applying the interaction training data to the first machine learning model to receive output multimodal memories; compare the output multimodal memories with the expected multimodal memory training data to determine a loss parameter for the first machine learning model; and update a characteristic of the first machine learning model based on the loss parameter.

In Example 4, the subject matter of Examples 2-3 includes, the operations further comprising: extracting, by the first machine learning model, the embeddings from the data in the different modalities; and combining the extracted embeddings from different modalities into a common vector.

In Example 5, the subject matter of Examples 1-4 includes, the operations further comprising: generating a graph-based data structure of nodes and edges, wherein the nodes represent embeddings and the edges represent relationships between the nodes.

In Example 6, the subject matter of Examples 1-5 includes, the operations further comprising: generating a data structure of entities, wherein each data structure of entities includes attributes corresponding to an individual entity and relationships with other entities.

In Example 7, the subject matter of Examples 1-6 includes, wherein a first of the different modalities is selected from a group consisting of text data, image data, audio data, and video data, wherein a second of the different modalities is selected from a group consisting of the text data, the image data, the audio data, and the video data, the first of the different modalities being different from the second of the different modalities.

In Example 8, the subject matter of Examples 1-7 includes, wherein the interaction data includes data from the first interaction client of the first user and data from a second interaction client of the first user.

In Example 9, the subject matter of Example 8 includes, wherein the first interaction client is selected from a group consisting of: a mobile phone, a tablet, a smart watch, or an Augmented Reality (AR) device, wherein the second interaction client is selected from a group consisting of: the mobile phone, the tablet, the smart watch, or the Augmented Reality (AR) device, wherein the first interaction client is of a different type than the second interaction client.

In Example 10, the subject matter of Examples 1-9 includes, wherein the second machine learning model is trained to generate personalized content based on prompt data and information of users stored within multimodal memory.

In Example 11, the subject matter of Examples 1-10 includes, wherein the operations further comprise: training the second machine learning model by: identifying prompt training data, multimodal memory training data for the prompt training data, and expected recommended content; applying the prompt training data and multimodal memory training data to receive output recommended content; comparing the output recommended content with the expected recommended content to determine a loss parameter for the second machine learning model; and updating one or more parameters of the second machine learning model based on the loss parameter.

In Example 12, the subject matter of Examples 1-11 includes, wherein identifying the prompt for the first user comprises receiving a question or request from the first user via text or speech.

In Example 13, the subject matter of Example 12 includes, wherein the operations further comprise identifying keywords from the prompt and applying weights to each of the identified keywords, wherein processing the data comprises applying the identified keywords and corresponding weights to the second machine learning model.

In Example 14, the subject matter of Examples 1-13 includes, wherein identifying the prompt for the first user comprises automatically generating the prompt based on an intent identified from real-time interaction data captured by the first interaction client.

In Example 15, the subject matter of Example 14 includes, wherein the real-time interaction data includes a current camera feed from a camera system of the first interaction client.

In Example 16, the subject matter of Examples 1-15 includes, wherein the operations further comprise identifying a preferred communication channel of the first user for the recommended content, wherein the recommended content is applied to the first interaction client based on identifying that the preferred communication channel is available via the first interaction client.

In Example 17, the subject matter of Examples 1-16 includes, the interaction data includes an image with a caption, wherein the multimodal memory links a textual description of an object detected in the image and text identified within the caption.

In Example 18, the subject matter of Example 17 includes, wherein the operations further comprise: applying a first weight to the textual description of the object detected in the image and a second weight to the text identified within the caption.

Example 19 is a method comprising: gathering interaction data from use of one or more interaction functions by a first user, wherein the interaction data includes, data in different modalities; generating a multimodal memory for the interaction data by applying the interaction data to a first machine learning model; identifying a prompt for the first user; processing a combination of data associated with the prompt and the multimodal memory using a second machine learning model to generate recommended content for the first user; and applying the recommended content to a first interaction client of the first user.

Example 20 is a non-transitory computer-readable storage medium storing instructions that, when executed by at least one processor, cause the at least one processor to perform operations comprising: gathering interaction data from use of one or more interaction functions by a first user, wherein the interaction data includes, data in different modalities; generating a multimodal memory for the interaction data by applying the interaction data to a first machine learning model; identifying a prompt for the first user; processing a combination of data associated with the prompt and the multimodal memory using a second machine learning model to generate recommended content for the first user; and applying the recommended content to a first interaction client of the first user.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:

at least one processor;

at least one memory component storing instructions that, when executed by the at least one processor, cause the at least one processor to perform operations comprising:

gathering interaction data from use of one or more interaction functions by a first user, wherein the interaction data includes data in different modalities;

generating a multimodal memory for the interaction data by applying the interaction data to a first machine learning model;

identifying a prompt for the first user;

processing a combination of data associated with the prompt and the multimodal memory using a second machine learning model to generate recommended content for the first user; and applying the recommended content to a first interaction client of the first user.

2. The system of claim 1, wherein the first machine learning model is trained to generate embeddings for data in different modalities.

3. The system of claim 1, wherein the operations further comprise:

training the first machine learning model by:

identifying interaction training data and expected multimodal memory training data for the interaction training data;

applying the interaction training data to the first machine learning model to receive output multimodal memories;

compare the output multimodal memories with the expected multimodal memory training data to determine a loss parameter for the first machine learning model; and update a characteristic of the first machine learning model based on the loss parameter.

4. The system of claim 2, the operations further comprising:

extracting, by the first machine learning model, the embeddings from the data in the different modalities; and combining the extracted embeddings from different modalities into a common vector.

5. The system of claim 1, the operations further comprising:

generating a graph-based data structure of nodes and edges, wherein the nodes represent embeddings and the edges represent relationships between the nodes.

6. The system of claim 1, the operations further comprising:

generating a data structure of entities, wherein the data structure of entities includes attributes corresponding to an individual entity and relationships with other entities.

7. The system of claim 1, wherein a first of the different modalities is selected from a group consisting of text data, image data, audio data, and video data, wherein a second of the different modalities is selected from a group consisting of the text data, the image data, the audio data, and the video data, the first of the different modalities being different from the second of the different modalities.

8. The system of claim 1, wherein the interaction data includes data from the first interaction client of the first user and data from a second interaction client of the first user.

9. The system of claim 8, wherein the first interaction client is selected from a group consisting of: a mobile phone, a tablet, a smart watch, or an Augmented Reality (AR) device, wherein the second interaction client is selected from a group consisting of: the mobile phone, the tablet, the smart watch, or the Augmented Reality (AR) device, wherein the first interaction client is of a different type than the second interaction client.

10. The system of claim 1, wherein the second machine learning model is trained to generate personalized content based on prompt data and information of users stored within the multimodal memory.

11. The system of claim 1, wherein the operations further comprise:

training the second machine learning model by:

identifying prompt training data, multimodal memory training data for the prompt training data, and expected recommended content;

applying the prompt training data and multimodal memory training data to receive output recommended content;

comparing the output recommended content with the expected recommended content to determine a loss parameter for the second machine learning model; and updating one or more parameters of the second machine learning model based on the loss parameter.

12. The system of claim 1, wherein identifying the prompt for the first user comprises receiving a question or request from the first user via text or speech.

13. The system of claim 12, wherein the operations further comprise identifying keywords from the prompt and applying weights to each of the identified keywords, wherein processing the data comprises applying the identified keywords and corresponding weights to the second machine learning model.

14. The system of claim 1, wherein identifying the prompt for the first user comprises automatically generating the prompt based on an intent identified from real-time interaction data captured by the first interaction client.

15. The system of claim 14, wherein the real-time interaction data includes a current camera feed from a camera system of the first interaction client.

16. The system of claim 1, wherein the operations further comprise identifying a preferred communication channel of the first user for the recommended content, wherein the recommended content is applied to the first interaction client based on identifying that the preferred communication channel is available via the first interaction client.

17. The system of claim 1, the interaction data includes an image with a caption, wherein the multimodal memory links a textual description of an object detected in the image and text identified within the caption.

18. The system of claim 17, wherein the operations further comprise: applying a first weight to the textual description of the object detected in the image and a second weight to the text identified within the caption.

19. A method comprising:

gathering interaction data from use of one or more interaction functions by a first user, wherein the interaction data includes data in different modalities;

generating a multimodal memory for the interaction data by applying the interaction data to a first machine learning model;

identifying a prompt for the first user;

processing a combination of data associated with the prompt and the multimodal memory using a second machine learning model to generate recommended content for the first user; and applying the recommended content to a first interaction client of the first user.

20. A non-transitory computer-readable storage medium storing instructions that, when executed by at least one processor, cause the at least one processor to perform operations comprising:

gathering interaction data from use of one or more interaction functions by a first user, wherein the interaction data includes data in different modalities;

generating a multimodal memory for the interaction data by applying the interaction data to a first machine learning model;

identifying a prompt for the first user;

processing a combination of data associated with the prompt and the multimodal memory using a second machine learning model to generate recommended content for the first user; and applying the recommended content to a first interaction client of the first user.

* * * * *